(12) United States Patent
Bowman et al.

(10) Patent No.: US 11,879,571 B2
(45) Date of Patent: *Jan. 23, 2024

(54) CAPTURED ELEMENT COUPLING

(71) Applicant: Victaulic Company, Easton, PA (US)

(72) Inventors: Matthew A. Bowman, Palmer, PA (US); Philip Wayne Bancroft, Belvidere, NJ (US); Scott D. Madara, Nazareth, PA (US); Kathryn E. Yovanovich, Easton, PA (US); Thomas C. Savage, Doylestown, PA (US)

(73) Assignee: Victaulic Company, Easton, PA (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/989,218

(22) Filed: Nov. 17, 2022

(65) Prior Publication Data

US 2023/0080901 A1 Mar. 16, 2023

Related U.S. Application Data

(60) Continuation of application No. 17/090,994, filed on Nov. 6, 2020, which is a division of application No.
(Continued)

(51) Int. Cl.
*F16L 23/08* (2006.01)
*F16L 17/04* (2006.01)
(Continued)

(52) U.S. Cl.
CPC .............. *F16L 17/04* (2013.01); *F16L 21/06* (2013.01); *F16L 21/08* (2013.01); *F16L 37/091* (2013.01); *F16L 2201/10* (2013.01)

(58) Field of Classification Search
CPC ......... F16L 17/04; F16L 17/035; F16L 21/06; F16L 21/065; F16L 21/08; F16L 23/08; F16L 25/14
See application file for complete search history.

(56) References Cited

U.S. PATENT DOCUMENTS

| 659,888 A | 10/1900 | Dresser |
| 1,020,123 A | 3/1912 | Brampton et al. |

(Continued)

FOREIGN PATENT DOCUMENTS

| CN | 1221089 A | 6/1999 |
| CN | 1959175 A | 5/2007 |

(Continued)

OTHER PUBLICATIONS

Author Unknown, Dudeco Product catalog; publication date unknown, pp. 1-16; obtained online at www.jcoupling.com.
(Continued)

*Primary Examiner* — Aaron M Dunwoody
(74) *Attorney, Agent, or Firm* — Ballard Spahr LLP

(57) ABSTRACT

A preassembled combination connects a captured pipe element to a second pipe element. First and second segments are connected end to end surrounding a central space for axially receiving the second pipe element. The segments are configured to be drawn toward one another and into engagement with the pipe elements. An annular body forms the captured pipe element. An end face of the captured pipe element is retained within the central space by engagement between a bead projecting from a sealing surface of the captured pipe element and the coupling assembly.

21 Claims, 28 Drawing Sheets

Related U.S. Application Data

15/593,662, filed on May 12, 2017, now Pat. No. 10,859,190.

(60) Provisional application No. 62/336,885, filed on May 16, 2016, provisional application No. 62/336,879, filed on May 16, 2016.

(51) Int. Cl.
*F16L 21/08* (2006.01)
*F16L 37/091* (2006.01)
*F16L 21/06* (2006.01)

(56) References Cited

U.S. PATENT DOCUMENTS

| | | |
|---|---|---|
| 1,074,395 A | 9/1913 | Welch |
| 1,203,989 A | 11/1916 | Dehn |
| 1,287,108 A | 12/1918 | Robinson et al. |
| 1,379,811 A | 5/1921 | Fyffe |
| 1,497,549 A | 6/1924 | Conradi |
| 1,649,594 A | 11/1927 | Johnson |
| 1,770,271 A | 7/1930 | Hoppes |
| 1,831,641 A | 11/1931 | Skinner |
| 1,834,968 A | 12/1931 | Rector |
| 1,969,043 A | 8/1934 | Sham |
| 1,999,045 A | 4/1935 | Goetz |
| 2,021,081 A | 11/1935 | Nagao |
| 2,021,082 A | 11/1935 | North |
| 2,067,428 A | 1/1937 | Wallis |
| 2,094,258 A | 9/1937 | Thompson |
| 2,128,720 A | 8/1938 | Tweedale |
| 2,225,208 A | 12/1940 | Crickmer |
| 2,412,394 A | 12/1946 | Giles |
| 2,426,423 A | 8/1947 | Woolsey |
| 2,459,251 A | 1/1949 | Stillwagon |
| 2,463,235 A | 3/1949 | Andrews |
| 2,491,004 A | 12/1949 | Graham |
| 2,635,901 A | 4/1953 | Osborn |
| 2,761,709 A | 9/1956 | Gilbert, Sr. |
| 2,775,806 A | 1/1957 | Love |
| 2,926,028 A | 2/1960 | Hookings et al. |
| 2,958,546 A | 11/1960 | Lee |
| 3,014,259 A | 12/1961 | Joseph |
| 3,054,629 A | 9/1962 | Piatek |
| 3,084,959 A | 4/1963 | Stanton |
| 3,116,078 A | 12/1963 | Scherer |
| 3,142,502 A | 7/1964 | Luther |
| 3,148,896 A | 9/1964 | Chu |
| 3,153,550 A | 10/1964 | Hollett |
| 3,235,293 A | 2/1966 | Condon |
| 3,362,730 A | 1/1968 | Clair et al. |
| 3,414,297 A | 12/1968 | Pollia |
| 3,466,069 A | 9/1969 | Hoke et al. |
| 3,479,066 A | 11/1969 | Gittleman |
| 3,507,520 A | 4/1970 | Guldener et al. |
| 3,517,701 A | 6/1970 | Smith |
| 3,550,638 A | 12/1970 | Smith |
| 3,596,935 A | 8/1971 | McGeoch, Sr. |
| 3,633,943 A | 1/1972 | Ramm et al. |
| 3,680,894 A | 8/1972 | Young |
| 3,768,819 A | 10/1973 | Burkert |
| 3,776,579 A | 12/1973 | Gale |
| 3,788,677 A | 1/1974 | Stade et al. |
| 3,794,360 A | 2/1974 | Bachle et al. |
| 3,825,286 A | 7/1974 | Henry, III |
| 3,861,723 A | 1/1975 | Kunz et al. |
| 3,920,270 A | 11/1975 | Babb, Jr. |
| 3,944,260 A | 3/1976 | Petroczky |
| 4,018,979 A | 4/1977 | Young |
| 4,073,514 A | 2/1978 | Pate |
| 4,119,333 A | 10/1978 | Straub |
| 4,123,090 A | 10/1978 | Kotsakis et al. |
| 4,183,555 A | 1/1980 | Martin |
| 4,225,160 A | 9/1980 | Ortloff |
| 4,249,786 A | 2/1981 | Mahoff |
| 4,273,367 A | 6/1981 | Keeney et al. |
| 4,284,298 A | 8/1981 | Kaufmann, Jr. |
| 4,326,737 A | 4/1982 | Lehmann |
| 4,372,587 A | 2/1983 | Roche |
| 4,408,788 A | 10/1983 | Beukema |
| 4,443,029 A | 4/1984 | Laxo |
| 4,461,498 A | 7/1984 | Kunsman |
| 4,471,979 A | 9/1984 | Gibb et al. |
| 4,522,434 A | 6/1985 | Webb |
| 4,568,112 A | 2/1986 | Bradley, Jr. et al. |
| 4,610,471 A | 9/1986 | Halen et al. |
| 4,611,839 A | 9/1986 | Rung et al. |
| 4,629,217 A | 12/1986 | Straub |
| 4,633,913 A | 1/1987 | Carty et al. |
| 4,639,016 A | 1/1987 | Rogers et al. |
| 4,639,020 A | 1/1987 | Rung et al. |
| 4,652,023 A | 3/1987 | Timmons |
| 4,664,422 A | 5/1987 | Straub |
| 4,678,208 A | 7/1987 | De Raymond |
| 4,702,499 A | 10/1987 | deRaymond et al. |
| 4,792,160 A | 12/1988 | Hwang |
| 4,819,974 A | 4/1989 | Zeidler |
| 4,838,584 A | 6/1989 | Dierksmeier |
| 4,842,306 A | 6/1989 | Zeidler et al. |
| 4,861,075 A | 8/1989 | Pepi et al. |
| 4,893,843 A | 1/1990 | DeRaymond |
| 4,896,902 A | 1/1990 | Weston |
| 4,898,407 A | 2/1990 | Zeidler |
| 5,018,768 A | 5/1991 | Palatchy |
| 5,022,685 A | 6/1991 | Stiskin et al. |
| 5,080,400 A | 1/1992 | Adamek et al. |
| 5,121,946 A | 6/1992 | Jardine |
| 5,137,305 A | 8/1992 | Straub |
| 5,161,836 A | 11/1992 | McKinnon |
| 5,203,594 A | 4/1993 | Straub |
| 5,230,537 A | 7/1993 | Newman |
| 5,273,322 A | 12/1993 | Straub |
| 5,280,970 A | 1/1994 | Straub |
| 5,354,108 A | 10/1994 | Sandor |
| 5,437,482 A | 8/1995 | Curtis |
| 5,452,922 A | 9/1995 | Ziu |
| 5,603,350 A | 2/1997 | Stoll et al. |
| 5,605,865 A | 2/1997 | Maniar et al. |
| 5,641,185 A | 6/1997 | Harth |
| 5,675,873 A | 10/1997 | Groess |
| 5,681,062 A | 10/1997 | Fukao et al. |
| 5,713,607 A | 2/1998 | Webb |
| 5,722,702 A | 3/1998 | Washburn |
| 5,758,907 A | 6/1998 | Dole et al. |
| 5,769,467 A | 6/1998 | Bridges |
| 5,772,257 A | 6/1998 | Webb et al. |
| 5,782,499 A | 7/1998 | Gfrerer et al. |
| 5,786,054 A | 7/1998 | Platusich et al. |
| 5,813,437 A | 9/1998 | Esser |
| 5,911,446 A | 6/1999 | McLennan et al. |
| 5,961,154 A | 10/1999 | Williams et al. |
| 6,030,006 A | 2/2000 | Lin |
| 6,056,332 A | 5/2000 | Foster |
| 6,065,784 A | 5/2000 | Lundstrom |
| 6,070,911 A | 6/2000 | Namikawa et al. |
| 6,076,861 A | 6/2000 | Ikeda |
| 6,131,957 A | 10/2000 | Saito et al. |
| 6,170,884 B1 | 1/2001 | McLennan et al. |
| 6,276,726 B1 | 8/2001 | Daspit |
| 6,276,729 B1 | 8/2001 | Sanwald et al. |
| 6,305,719 B1 | 10/2001 | Smith, Jr. et al. |
| 6,328,352 B1 | 12/2001 | Geppert et al. |
| 6,367,849 B1 | 4/2002 | Tatsuta et al. |
| 6,450,551 B1 | 9/2002 | Lee |
| 6,499,771 B1 | 12/2002 | Snyder, Sr. et al. |
| 6,502,865 B1 | 1/2003 | Steele |
| 6,505,865 B2 | 1/2003 | Minemyer |
| 6,626,456 B2 | 9/2003 | Terbu et al. |
| 6,626,466 B1 | 9/2003 | Dole |
| 6,672,631 B1 | 1/2004 | Weinhold |
| 6,691,790 B1 | 2/2004 | MacDonald, III et al. |
| 6,749,232 B2 | 6/2004 | Wachter et al. |
| 6,921,115 B2 | 7/2005 | Gill |

(56) References Cited

U.S. PATENT DOCUMENTS

| | | |
|---|---|---|
| 7,070,209 B2 | 7/2006 | Collins |
| 7,086,131 B2 | 8/2006 | Gibb et al. |
| 7,090,259 B2 | 8/2006 | Dole |
| 7,341,287 B2 | 3/2008 | Gibb et al. |
| 7,434,846 B2 | 10/2008 | Baumgartner |
| 7,490,866 B2 | 2/2009 | Webb et al. |
| 7,500,699 B2 | 3/2009 | Snyder, Sr. et al. |
| 7,523,963 B2 | 4/2009 | Draper et al. |
| 7,644,960 B2 | 1/2010 | Casey, Sr. et al. |
| 7,654,587 B2 | 2/2010 | Gibb et al. |
| 7,712,796 B2 | 5/2010 | Gibb et al. |
| 7,726,703 B2 | 6/2010 | Porter et al. |
| 7,789,434 B2 | 9/2010 | Nagle et al. |
| 7,798,535 B2 | 9/2010 | Calhoun |
| 7,841,630 B1 | 11/2010 | Auray et al. |
| 7,861,982 B1 | 1/2011 | McClure |
| 7,891,713 B2 | 2/2011 | Bekkevold |
| 7,921,536 B2 | 4/2011 | Dole |
| 7,988,207 B2 | 8/2011 | Dole et al. |
| 7,996,981 B2 | 8/2011 | Dole et al. |
| 8,136,847 B2 | 3/2012 | Madara et al. |
| 8,413,734 B2 | 4/2013 | Silcox et al. |
| 8,424,179 B2 | 4/2013 | Webb et al. |
| 8,517,430 B2 | 8/2013 | Dole et al. |
| 8,777,277 B2 | 7/2014 | Dole et al. |
| 8,820,795 B2 | 9/2014 | Dole |
| 8,827,214 B2 | 9/2014 | Ogawa |
| 9,151,422 B2 | 10/2015 | Kayacik et al. |
| 9,482,374 B2 | 11/2016 | Henry |
| 9,791,083 B2 | 10/2017 | Gibb et al. |
| 9,890,884 B1 | 2/2018 | Chiproot |
| 9,976,677 B2 | 5/2018 | Lurk et al. |
| 9,979,103 B2 | 5/2018 | Pari |
| 10,408,368 B2 | 9/2019 | Bancroft et al. |
| 10,458,579 B2 | 10/2019 | Bowman et al. |
| 10,627,025 B2 | 4/2020 | Bowman et al. |
| 10,641,421 B2 | 5/2020 | Beagen, Jr. |
| 10,661,488 B2 | 5/2020 | French et al. |
| 10,704,511 B2 | 7/2020 | Williams et al. |
| 10,731,776 B2 | 8/2020 | Ciasulli et al. |
| 10,731,780 B2 | 8/2020 | Bowman et al. |
| 10,859,190 B2 | 12/2020 | Bowman et al. |
| 10,883,636 B2 | 1/2021 | Schilling et al. |
| 10,890,283 B2 | 1/2021 | Suijaatmadja et al. |
| 10,962,159 B2 | 3/2021 | Kujawski, Jr. |
| 11,060,639 B2 | 7/2021 | Cuvo et al. |
| 2002/0135184 A1 | 9/2002 | Snyder et al. |
| 2002/0185868 A1 | 12/2002 | Snyder et al. |
| 2002/0195820 A1 | 12/2002 | Suijaatmadja |
| 2003/0020276 A1 | 1/2003 | Steele |
| 2004/0080157 A1 | 4/2004 | Borgmeier et al. |
| 2004/0237632 A1 | 12/2004 | Van Keeken |
| 2005/0001428 A1 | 1/2005 | Scherrer |
| 2005/0028366 A1 | 2/2005 | Bien et al. |
| 2005/0067538 A1 | 3/2005 | Stigler |
| 2005/0082831 A1 | 4/2005 | Borland |
| 2005/0212284 A1 | 9/2005 | Dole |
| 2005/0253029 A1 | 11/2005 | Gibb et al. |
| 2005/0253380 A1 | 11/2005 | Gibb et al. |
| 2006/0087121 A1 | 4/2006 | Bradley |
| 2006/0103136 A1 | 5/2006 | Krengel et al. |
| 2006/0138776 A1 | 6/2006 | Amedure et al. |
| 2006/0214422 A1 | 9/2006 | Cuvo et al. |
| 2007/0024056 A1 | 2/2007 | Borland |
| 2007/0090646 A1 | 4/2007 | Dole et al. |
| 2007/0296213 A1 | 12/2007 | Jones et al. |
| 2008/0007061 A1* | 1/2008 | Gibb ............ F16L 17/04 285/364 |
| 2008/0054636 A1 | 3/2008 | Reid |
| 2008/0066932 A1 | 3/2008 | Macdonald, III et al. |
| 2008/0093847 A1 | 4/2008 | Sundholm |
| 2008/0129048 A1 | 6/2008 | Nagle et al. |
| 2008/0265568 A1 | 10/2008 | Bekkevold |
| 2008/0272595 A1 | 11/2008 | Gibb et al. |
| 2008/0284161 A1 | 11/2008 | Dole et al. |
| 2009/0127846 A1 | 5/2009 | Dole et al. |
| 2009/0160183 A1 | 6/2009 | Felber |
| 2009/0172939 A1 | 7/2009 | Dole |
| 2009/0206598 A1 | 8/2009 | Gibb et al. |
| 2010/0115733 A1 | 5/2010 | Bouchiat et al. |
| 2010/0148493 A1 | 6/2010 | Madara et al. |
| 2010/0197627 A1 | 8/2010 | Wang et al. |
| 2010/0296925 A1 | 11/2010 | Sakai |
| 2010/0320756 A1 | 12/2010 | Gibb et al. |
| 2010/0320758 A1 | 12/2010 | Sisk |
| 2010/0327576 A1 | 12/2010 | Linhorst et al. |
| 2011/0062706 A1 | 3/2011 | Henry |
| 2011/0154646 A1 | 6/2011 | Hagiya |
| 2011/0254268 A1 | 10/2011 | Johnson et al. |
| 2012/0025524 A1 | 2/2012 | Krausz et al. |
| 2012/0074689 A1 | 3/2012 | Petersen et al. |
| 2012/0098259 A1 | 4/2012 | Sarkisian et al. |
| 2012/0205909 A1 | 8/2012 | Bird |
| 2012/0235405 A1 | 9/2012 | Dole et al. |
| 2012/0256415 A1 | 10/2012 | Dole |
| 2012/0256418 A1 | 10/2012 | Horgan |
| 2012/0306118 A1 | 12/2012 | Hayashi et al. |
| 2012/0306198 A1 | 12/2012 | McDonald Pinedo |
| 2013/0125373 A1 | 5/2013 | Bancroft |
| 2013/0127160 A1 | 5/2013 | Bancroft et al. |
| 2013/0181446 A1 | 7/2013 | Le Clinche |
| 2013/0319568 A1 | 12/2013 | Daugherty et al. |
| 2013/0327415 A1 | 12/2013 | Camp, Jr. et al. |
| 2014/0070529 A1 | 3/2014 | Bancroft et al. |
| 2014/0239633 A1 | 8/2014 | Swingley |
| 2014/0327238 A1 | 11/2014 | Bowman |
| 2015/0001846 A1 | 1/2015 | Griffin |
| 2015/0021911 A1 | 1/2015 | Bowman et al. |
| 2015/0176728 A1 | 6/2015 | Bowman |
| 2015/0204471 A1 | 7/2015 | Sato |
| 2016/0084420 A1 | 3/2016 | Barrientos |
| 2016/0228734 A1 | 8/2016 | Shipman |
| 2016/0250507 A1 | 9/2016 | Shipman |
| 2017/0184226 A1 | 6/2017 | Cuvo et al. |
| 2017/0328500 A1 | 11/2017 | Bowman et al. |
| 2017/0328507 A1 | 11/2017 | Sith et al. |
| 2018/0163905 A1 | 6/2018 | Ohnemus et al. |
| 2018/0163906 A1 | 6/2018 | Ohnemus et al. |
| 2018/0200550 A1 | 7/2018 | Bancroft et al. |
| 2019/0032824 A1 | 1/2019 | McNamara et al. |
| 2019/0032825 A1 | 1/2019 | McNamara et al. |
| 2020/0088329 A1 | 3/2020 | Madara et al. |
| 2020/0088330 A1 | 3/2020 | Lippka |
| 2020/0208765 A1 | 7/2020 | Kishi et al. |
| 2020/0232586 A1 | 7/2020 | Lüers |
| 2020/0263818 A1 | 8/2020 | Prince |
| 2020/0292110 A1 | 9/2020 | Bunn, Sr. |
| 2020/0408339 A1 | 12/2020 | Tan et al. |
| 2021/0071794 A1 | 3/2021 | Chan et al. |
| 2021/0108747 A1 | 4/2021 | Iida et al. |

FOREIGN PATENT DOCUMENTS

| | | |
|---|---|---|
| CN | 101886721 A | 11/2010 |
| CN | 102345774 A | 2/2012 |
| CN | 102933886 A | 2/2013 |
| CN | 104204640 A | 12/2014 |
| CN | 105423015 A | 3/2016 |
| CN | 105473923 A | 4/2016 |
| DE | 669605 C | 12/1938 |
| DE | 3111997 A1 | 10/1982 |
| DE | 3443942 A1 | 6/1985 |
| DE | 3443943 A1 | 6/1985 |
| DE | 19532356 A1 | 4/1996 |
| DE | 10006029 A1 | 8/2001 |
| DE | 202012011293 U1 | 1/2013 |
| EP | 0462454 A1 | 12/1991 |
| EP | 1840439 A2 | 10/2007 |
| EP | 2112414 A1 | 10/2009 |
| EP | 2113701 A1 | 11/2009 |
| EP | 2487397 A1 | 8/2012 |
| FR | 1201165 A | 12/1959 |
| FR | 2683017 A1 | 4/1993 |
| FR | 2685057 A1 | 6/1993 |

(56) References Cited

FOREIGN PATENT DOCUMENTS

| | | | |
|---|---|---|---|
| FR | 2747453 A1 | 10/1997 |
| FR | 2921985 A1 | 4/2009 |
| GB | 1499346 A | 2/1978 |
| GB | 2098297 A | 11/1982 |
| GB | 2211255 A | 6/1989 |
| JP | S524772 B1 | 2/1977 |
| JP | S52126317 A | 10/1977 |
| JP | S5615891 A | 2/1981 |
| JP | S594228 Y2 | 2/1984 |
| JP | 6147362 A | 5/1994 |
| JP | 07269764 | 10/1995 |
| JP | 2001304468 A | 10/2001 |
| JP | 2002147664 A | 5/2002 |
| JP | 2006250247 A | 9/2006 |
| JP | 2007537414 A | 12/2007 |
| JP | 2008202791 A | 9/2008 |
| JP | 2009167971 A | 7/2009 |
| JP | 2011163474 A | 8/2011 |
| JP | 2012026578 A | 2/2012 |
| JP | 2012189147 A | 10/2012 |
| JP | 2013542382 A | 11/2013 |
| JP | 2014001848 A | 1/2014 |
| JP | 5615891 B2 | 10/2014 |
| KR | 100315861 B1 | 11/2001 |
| KR | 20090007813 A | 1/2009 |
| KR | 100904419 B1 | 6/2009 |
| KR | 20090066767 A | 6/2009 |
| WO | 9703811 A1 | 2/1997 |
| WO | 2005114023 A2 | 12/2005 |
| WO | 2008144302 A1 | 11/2008 |
| WO | 2013077966 A1 | 5/2013 |
| WO | 2013115963 A1 | 8/2013 |

OTHER PUBLICATIONS

In the United States District Court; In and for the District of Delaware; Markman Transcript; *Victaulic Company* vs *Anvil International, LLC*; Sep. 23, 2021; 99 pages.
In the Unites States District Court for the District of Delaware; *Victaulic Company v. ASC Engineered Solutions, LLC*; Claim Construction Order; Oct. 19, 2021; 3 pages.
In the United States District Court for the District of Delaware; *Victaulic Company v. ASC Engineered Solutions, LLC*; Joint Claim Construction Brief; Aug. 25, 2021; 105 pages.
In the United States District Court for the District of Delaware; *Victaulic Company v. ASC Engineered Solutions, LLC*; Appendix in Support of Joint Claim Construction Brief; Aug. 25, 2021; Sections A through D; 163 pages.
In the United States District Court for the District of Delaware; *Victaulic Company v. ASC Engineered Solutions, LLC*; Appendix in Support of Joint Claim Construction Brief; Aug. 25, 2021; Sections E through I; 144 pages.
In the United States District Court for the District of Delaware; *Victaulic Company v. ASC Engineered Solutions, LLC*; Appendix in Support of Joint Claim Construction Brief; Aug. 25, 2021; Sections J through M; 141 pages.
In the United States District Court for the District of Delaware; *Victaulic Company v. ASC Engineered Solutions, LLC*; Appendix in Support of Joint Claim Construction Brief; Aug. 25, 2021; Sections N through Q; 157 pages.
In the United States District Court for the District of Delaware; *Victaulic Company v. ASC Engineered Solutions, LLC*; Appendix in Support of Joint Claim Construction Brief; Aug. 25, 2021; Sections R through X; 176 pages.
In the United States District Court for the District of Delaware; *Victaulic Company v. ASC Engineered Solutions, LLC*; Appendix in Support of Joint Claim Construction Brief; Aug. 25, 2021; Cameron Declaration; 36 pages.
Dec. 31, 2018—U.S. Appl. No. 15/387,894; Non Final Rejection; 41 pages.
Apr. 12, 2019—U.S. Appl. No. 15/387,894; Reply to Office Action of dated Dec. 31, 2018; 12 pages.
Jun. 13, 2019—U.S. Appl. No. 15/387,894; Final Rejection; 13 pages.
Dec. 12, 2019—U.S. Appl. No. 15/387,894; Appeal Brief; 16 pages.
Mar. 5, 2020—U.S. Appl. No. 15/387,894; Examiners Answer to Appeal Brief of Dec. 12, 2019; 16 pages.
Mar. 10, 2020—U.S. Appl. No. 15/387,894; Reply to Examiners Answer of Mar. 5, 2020; 3 pages.
Oct. 23, 2020—U.S. Appl. No. 15/387,894; Patent Board Decision—Examiner Affirmed; 8 pages.
Dec. 22, 2020—U.S. Appl. No. 15/387,894; Reply to Office Action after Decision on Appeal of Oct. 23, 2020; 12 pages.
Jan. 13, 2021—U.S. Appl. No. 15/387,894; Non-final Rejection; 13 pages.
Jan. 20, 2021—U.S. Appl. No. 15/387,894; Reply to Non-final Rejection of Jan. 13, 2021; 12 pages.
Apr. 14, 2021—U.S. Appl. No. 15/387,894; Final Rejection; 20 pages.
Oct. 12, 2021—U.S. Appl. No. 15/387,894; Reply to Final Rejection of Apr. 14, 2021; 17 pages.
Feb. 22, 2022—U.S. Appl. No. 15/387,894; Non-final Rejection; 21 pages.
Aug. 19, 2022—U.S. Appl. No. 15/387,894; Reply to Non Final Rejection of Feb. 22, 2022; 20 pages.
Nov. 16, 2022—U.S. Appl. No. 15/387,894; Final Rejection; 15 pages.
Jul. 18, 2019—U.S. Appl. No. 16/413,726; Restriction Requirement; 5 pages.
Sep. 3, 2019—U.S. Appl. No. 16/413,726; Reply to Restriction Requirement of Jul. 18, 2019; 7 pages.
Jan. 8, 2020—U.S. Appl. No. 16/413,726; Non Final Rejection; 13 pages.
Mar. 25, 2020—U.S. Appl. No. 16/413,726; Reply to Non Final Rejection of Jan. 8, 2020; 17 pages.
Apr. 15, 2020—U.S. Appl. No. 16/413,726; Final Office Action; 24 pages.
Oct. 9, 2020—U.S. Appl. No. 16/413,726; Affidavit of Douglas R. Dole filed with the Reply to Final Rejection of Apr. 15, 2020; 47 pages.
Oct. 13, 2020—U.S. Appl. No. 16/413,726; Reply to Final Rejection of Apr. 15, 2020; 17 pages.
Feb. 3, 2021—U.S. Appl. No. 16/413,726; Non Final Rejection; 17 pages.
Mar. 19, 2021—U.S. Appl. No. 16/413,726; Reply to Non Final Rejection of Feb. 3, 2021; 8 pages.
In the United States District Court for the District of Delaware; *Victaulic Company v. Anvil International, LLC*; *Anvil International, LLC v. Victaulic Company*; Defendant and Counterclaim-Plaintiff Anvil International, LLC's Initial Invalidity Contentions; Mar. 15, 2021; 189 pages.

* cited by examiner

CAPTURED ELEMENT COUPLING

CROSS REFERENCE TO RELATED APPLICATIONS

This application is a continuation of U.S. patent application Ser. No. 17/090,994, filed Nov. 6, 2020, which application is a divisional of U.S. patent application Ser. No. 15/593,662, filed May 12, 2017, now U.S. Pat. No. 10,859,190, issued Dec. 8, 2020, which application is based upon and claims the benefit of priority to U.S. Provisional Application No. 62/336,879, filed May 16, 2016, and U.S. Provisional Application No. 62/336,885, filed May 16, 2016, all aforementioned applications being hereby incorporated by reference herein.

FIELD OF THE INVENTION

This invention relates to mechanical pipe couplings for joining pipe elements.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

An example mechanical coupling segment comprises a housing having projections which extend inwardly from the housing and engage, for example, the outer surfaces of pipe elements of various configurations including, for example, pipe elements having circumferential grooves as well as plain end pipe elements. Engagement between the projections and the pipe elements provides mechanical restraint to the joint and ensures that the pipe elements remain coupled even under high internal pressure and external forces. The housings also define an annular channel that receives a ring gasket or seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

Mechanical couplings for grooved pipe elements according to the prior art have continuous arcuate projections on the segments that engage the outer surfaces of the pipe elements which they are joining end to end. These arcuate projections are part of the segment structure commonly referred to as the "keys" of the coupling. The keys may engage the outer surface of pipe element in various configurations including, for example, pipe element having circumferential grooves.

The arcuate projections on prior art couplings for grooved pipe elements typically have arcuate surfaces with a radius of curvature that is substantially matched to or marginally larger than the radius of curvature of the outer surface of the pipe element within the groove that it is intended to engage. For couplings used with grooved pipe elements, the radii of curvature of the arcuate surfaces are smaller than the radii of curvature of the outer surfaces of the pipe elements outside of the grooves so that the projections fit within and engage the grooves.

For couplings used with plain end pipe elements, toothed retainers may be used to form the projections. When the retainers are properly installed in the segments, engagement between the teeth and the pipe elements provides mechanical restraint to the joint and ensures that the pipe elements remain coupled even under high internal pressure and external forces. Some retainers use teeth that are angularly oriented with respect to a radius from the center of the pipe elements. The proper angular orientation allows the teeth to be "self-actuating", i.e., the mechanical engagement between the teeth and the pipe elements increases with increasing force on the pipe elements trying to draw or push them out of the coupling. Hence, the force resisting withdrawal increases with the applied force that would otherwise cause withdrawal. However, if such retainers are installed improperly, for example, if the retainer is reversed within the coupling, then the teeth will not be self-actuating against forces which would draw or push the pipe element out of the coupling. Thus the retainer would not provide sufficient mechanical engagement against withdrawal and the pipe elements will not be securely held within the coupling. For couplings having retainers it is difficult to determine if the retainers are properly installed before the joint is pressurized. It would be advantageous if pipe couplings could be designed so that the user is alerted if the retainer is not properly installed during assembly of the joint.

Methods of securing pipe elements in end to end relation comprise a sequential installation process when mechanical couplings according to the prior art are used. Typically, the coupling is received by the technician with the segments bolted together and the ring gasket captured within the segments' channels. The technician first disassembles the coupling by unbolting it, removes the ring gasket, lubricates it (if not pre-lubricated) and places it around the ends of the pipe elements to be joined. Installation of the ring gasket often requires that it be lubricated and stretched to accommodate the pipe elements. With the ring gasket in place on both pipe elements, the segments are then placed one at a time straddling the ends of the pipe elements and capturing the ring gasket against them. During placement, the segments engage the gasket, the projections are aligned with the grooves, the bolts are inserted through the lugs, the nuts are threaded onto the bolts and tightened, drawing the coupling segments toward one another, compressing the gasket and engaging the projections within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY

The invention concerns a coupling for joining pipe elements. In one example embodiment the coupling comprises first and second segments positioned end to end surrounding a central space for receiving the pipe elements. A spring assembly joins a first end of the first segment to a first end of the second segment. The spring assembly biases the segments away from one another. An adjustable attachment assembly joins a second end of the first segment to a second end of the second segment. The adjustable attachment assembly is adapted to draw the first and second segments toward one another and into engagement with the pipe elements.

In one example embodiment, the spring assembly comprises a first boss projecting from the first end of the first segment and a second boss projecting from the first end of the second segment. The second boss is positioned adjacent to the first boss. A first fulcrum is positioned on the first boss and contacts the second boss. The segments pivot about the first fulcrum. A link extends between and capturing the first and second bosses.

An example embodiment may further comprise a second fulcrum positioned on the second boss. The second fulcrum contacts the first fulcrum.

Another example embodiment comprises a first land positioned contiguous with the first fulcrum on the first boss and a second land positioned contiguous with the second fulcrum on the second boss. The first and second lands are oriented angularly with respect to a plane defining an interface between the first and second segments.

Further by way of example, the coupling may comprise a first head projecting from the first boss and a second head projecting from the second boss. The link engages the first and second heads for retaining the link to the bosses. In an example embodiment the link comprises a ring encircling the first and second bosses.

By way of example the adjustable attachment assembly may comprises a first lug attached to the second end of the first segment. A second lug is attached to the second end of the second segment and is positioned in facing relation with the first lug. Each lug defines a respective hole. A fastener extends between the first and second lugs. The fastener is received within the respective holes. The fastener is adjustable for drawing the segments toward one another against the biasing of the spring assembly.

In an example embodiment each of the first and second segments may comprises first and second channels positioned on opposite sides of the segments. Each of the channels extends between the ends of the segments and has a first floor and a second floor facing the central space. The first floor has a greater radius of curvature than the second floor. First and second retainers are positioned respectively in the first and second channels. Each of the retainers comprises a band having oppositely disposed ends. A plurality of teeth are positioned along one edge of the band. The teeth project toward the central space. At least one tab is positioned along an opposite edge of the band. The band overlies the first floor. The at least one tab overlies the second floor when the retainers are positioned within the channels. An example according to the invention may comprise a plurality of tabs.

By way of example, a third channel is positioned between the first and second channels in each of the segments. The third channels extend between the ends of the segments and facing the central space.

In an example embodiment, the teeth are oriented angularly with respect to a line extending radially from an axis arranged coaxially with the central space. In a further example, the at least one tab is oriented perpendicularly to a line extending radially from an axis arranged coaxially with the central space. Further by way of example, the at least one tab is offset from the band toward an axis arranged coaxially with the central space. In a specific example embodiment, the at least one tab projects toward the third channel.

In an example embodiment, a first aperture is positioned in at least one of the segments. The first aperture may be aligned with the first channel and provide a line of sight toward the central space. In an example embodiment the first aperture is positioned between the first and second segments. The first aperture may comprise a trough positioned at an interface between the first and second segments by way of example. A further example comprises a second aperture in at least one of the segments. The second aperture may be aligned with the second channel and provide a line of sight toward the central space. The second aperture may be positioned between the first and second segments and may comprise a trough positioned at an interface between the two segments for example.

In an example embodiment a ring seal is positioned within the third channels. The ring seal has an inner surface sized to receive the pipe elements and an outer surface sized to support the segments in spaced apart relation sufficient to permit insertion of the pipe elements into the central space while the segments are attached to one another. Further by way of example, the retainer bands may be sized to cooperate with the ring seals to support the housing portions in the spaced apart relation.

In another example embodiment, each of the first and second segments comprises first and second shoulders positioned on opposite sides of each of the segments. The shoulders extend lengthwise along the segments and project toward the central space. The shoulders define a channel therebetween. A first arcuate surface is positioned on the first shoulder, and a second arcuate surface is positioned on the second shoulder. The arcuate surfaces face the central space in this example. A plurality of projections may be positioned on each of the first and second arcuate surfaces. The projections project toward the central space. In an example embodiment, the first arcuate surface may have a first radius of curvature and the second arcuate surface may have a second radius of curvature wherein the second radius of curvature is less than the first radius of curvature.

In an example embodiment a ring seal is positioned within the channel. The ring seal has an inner surface sized to receive the pipe elements and an outer surface sized to support the segments in spaced apart relation sufficient to permit insertion of the pipe elements into the central space while the segments are attached to one another.

The invention further encompasses, in combination, a coupling and a first pipe element. The coupling is for joining a second pipe element to the first pipe element. In an example embodiment, he coupling comprises first and second segments positioned end to end surrounding a central space for receiving the pipe elements. First and second shoulders are positioned on opposite sides of each of the segments. The shoulders extend lengthwise along the segments and project toward the central space. A first arcuate surface is positioned on the first shoulder. A second arcuate surface is positioned on the second shoulder. The arcuate surfaces face the central space. A spring assembly joins a first end of the first segment to a first end of the second segment. The spring assembly biases the segments away from one another. An adjustable attachment assembly joins a second end of the first segment to a second end of the second segment. The adjustable attachment assembly is adapted to draw the first and second segments toward one another and into engagement with the pipe elements. The first pipe element comprises a rim projecting outwardly from the first pipe element and extending circumferentially. The rim is positioned in spaced relation to an end of the first pipe element. The rim engages the first shoulder and is captured within the central space.

In an example embodiment the rim is defined by a circumferential groove in the first pipe element. In another example embodiment the rim is defined by a circumferential bead which projects radially outwardly from the first pipe element.

In an example embodiment the spring assembly comprises a first boss projecting from the first end of the first segment. A second boss projects from the first end of the second segment and is positioned adjacent to the first boss. A first fulcrum is positioned on the first boss and contacts the second boss. The segments pivot about the first fulcrum. A link extends between and capturing the first and second bosses.

An example embodiment may further comprise a second fulcrum positioned on the second boss. The second fulcrum contacts the first fulcrum. A first land may be positioned contiguous with the first fulcrum on the first boss, and a second land may be positioned contiguous with the second fulcrum on the second boss. The first and second lands are oriented angularly with respect to a plane defining an interface between the first and second segments. In another example embodiment of a combination according to the invention, a first head projects from the first boss, and a second head projects from the second boss. The link engages the first and second heads for retaining the link to the bosses. In an example embodiment the link comprises a ring encircling the first and second bosses.

In an example embodiment of the combination, the adjustable attachment assembly comprises a first lug attached to the second end of the first segment. A second lug is attached to the second end of the second segment and is positioned in facing relation with the first lug. Each lug defines a respective hole. A fastener extends between the first and second lugs. The fastener is received within the respective holes. The fastener is adjustable for drawing the segments toward one another against the biasing of the spring assembly.

In a further example embodiment the combination comprises a channel positioned between the first and second shoulders in each of the segments. The channels extend between the ends of the segments and face the central space. Further by way of example, a ring seal is positioned within the channels. The ring seal has an inner surface sized to receive the pipe elements and an outer surface sized to support the segments in spaced apart relation sufficient to permit insertion of the second pipe element into the central space while the segments are attached to one another and the first pipe element is captured within the central space.

A plurality of projections may be positioned on each of the first and second arcuate surfaces in an example embodiment of the combination. The projections project toward the central space. An example embodiment may further comprise at least one aperture in at least one of the segments. The at least one aperture may be positioned between the first and second segments. In an example embodiment, the at least one aperture comprises a trough positioned at an interface between the first and second segments.

The invention also encompasses a method of assembling the combination coupling and pipe element. In one example embodiment the method comprises: positioning the first pipe element with the rim engaged with the first shoulder of the first segment; engaging the first end of the first segment with the first end of the second segment to form the spring assembly; supporting the first and second segments in spaced apart relation sufficient to permit insertion of the second pipe element into the central space while capturing the first pipe element within the central space; attaching the second end of the first segment to the second end of the second segment using the adjustable attachment assembly.

Further by way of example, the method may comprise: engaging the first pipe element with a ring seal; positioning the ring seal within a channel defined by the first and second shoulders of the first segment.

By way of example, the method may further include supporting the first and second segments in spaced apart relation sufficient to permit insertion of the second pipe element into the central space while capturing the first pipe element within the central space comprises support the segments on a ring seal positioned within a channel positioned between the first and second shoulders in each of the segments.

In an example embodiment, engaging the first end of the first segment with the first end of the second segment to form the spring assembly may comprise: joining a first boss projecting from the first end of the first segment with a second boss projecting from a first end of the second segment using a link, and contacting the second boss with a fulcrum positioned on the first boss.

Further by way of example, joining the first boss projecting from the first end of the first segment with a second boss projecting from the first end of the second segment using the link may comprise inserting the projections within a ring such that the ring surrounds the bosses.

In another example, attaching the second end of the first segment to the second end of the second segment using the adjustable attachment assembly may comprise attaching a first lug mounted on the second end of the first segment to a second lug mounted on the second end of the second segment using a fastener extending between the first and second lugs.

In an example embodiment for joining the second pipe element to the first pipe element, the example method comprises: with the segments attached to one another in spaced apart relation and with the rim of the first pipe element captured within the central space, inserting the second pipe element into the central space; engaging the second pipe element with the ring seal; drawing the segments toward one another using the adjustable attachment assembly.

An example method may further comprise engaging the first and second arcuate surfaces with the first and second pipe elements respectively upon drawing the segments toward one another. An example method may further comprise engaging projections on the first and second arcuate surfaces with the first and second pipe elements respectively upon drawing the segments toward one another.

In an example embodiment, the drawing the segments toward one another using the adjustable attachment assembly may comprise: tightening a fastener extending between first and second lugs, the first lug being attached to the second end of the first segment, the second lug being attached to the second end of the second segment and positioned in facing relation with the first lug, the fastener being adjustable for drawing the segments toward one another against the biasing of the spring assembly.

By way of example, a method further comprises: observing, through an aperture in at least one of the segments, whether or not the second pipe element is present within the central space; adjusting a positions of the second pipe element within the central space if the second pipe element is not present within the central space; and drawing the segments toward one another once the second pipe element is observed to be present within the central space.

The invention also concerns another example coupling for joining pipe elements. In one example embodiment the coupling comprises first and second segments attached to one another end to end surrounding a central space for receiving the pipe elements. By way of example each of the segments comprises first and second channels positioned on opposite sides of the segments. Each of the channels extends between the ends of the segments and has a first floor and a second floor facing the central space. The first floor has a greater radius of curvature than the second floor. First and second retainers are positioned respectively in the first and second channels. Each of the retainers comprises a band having oppositely disposed ends. A plurality of teeth are positioned along one edge of the band and project toward the central space. A plurality of tabs are positioned along an opposite edge of the band. The band overlies the first floor, and the tabs overlie the second floor when the retainers are positioned within the channels.

The example coupling further comprises a third channel positioned within each of the segments. The third channels face the central space. A ring seal is positioned within the third channels.

In a particular example embodiment the second channels are positioned between the first channels and the third channels. By way of further example the teeth are oriented angularly with respect to a radius extending from a center of the central space. Further by way of example the tabs are oriented perpendicular to a radius extending from a center of the central space. In a specific example the tabs project toward the third channels.

Another example embodiment comprises first and second attachment members positioned at opposite ends of the segments. At least one of the attachment members is adjustably tightenable for drawing the first and second segments toward one another. In one example embodiment the first attachment member comprises first and second lugs positioned respectively on the first and second segments. The first and second lugs are in facing relation. A first fastener extends between the first and second lugs. Tightening of the first fastener draws the segments toward one another. In another example embodiment the second attachment member comprises third and fourth lugs positioned respectively on the first and second segments. The third and fourth lugs are in facing relation. A second fastener extends between the third and fourth lugs. Tightening of the second fastener draws the segments toward one another.

The invention further encompasses a coupling for joining pipe elements which, by way of example, comprises first and second segments attached to one another end to end surrounding a central space for receiving the pipe elements. In this example embodiment each of the segments comprises at least one channel positioned on one side of the segments. The at least one channel extends between the ends of the segments and has a first floor and a second floor facing the central space. The first floor has a greater radius of curvature than the second floor. A retainer is positioned in the at least one channel. The retainer comprises a band having oppositely disposed ends. A plurality of teeth are positioned along one edge of the band and project toward the central space. A plurality of tabs are positioned along an opposite edge of the band. The band overlies the first floor, the tabs overlie the second floor when the retainer is positioned within the at least one channel.

In another aspect the invention concerns a coupling for joining pipe elements having circumferential grooves adjacent an end thereof. In one example embodiment the coupling comprises first and second segments attached to one another end to end surrounding a central space for receiving the pipe elements. By way of example, each of the segments comprises first and second sidewalls positioned on opposite sides of the segments. Each of the sidewalls extends between the ends of the segments and has an arcuate surface facing the central space. In a specific example a plurality of projections are positioned on each of the arcuate surfaces. The projections are arranged in spaced relation to one another and projecting toward the central space. A channel is positioned within each of the segments. The channel is positioned between the first and second sidewalls and faces the central space. A ring seal is positioned within the channel. The ring seal has an inner surface sized to receive the pipe elements and an outer surface sized to support the segments in spaced apart relation sufficient to permit insertion of the pipe elements into the central space.

By way of example the coupling further comprises first and second attachment members positioned at opposite ends of the segments. The first attachment member is adjustably tightenable for drawing the first and second segments toward one another and engaging the projections with the circumferential grooves in the pipe elements once the pipe elements are inserted into the central space. In a specific example embodiment the first attachment member comprises first and second lugs positioned respectively on the first and second segments. The first and second lugs are in facing relation. A fastener extends between the first and second lugs. Tightening of the fastener draws the segments toward one another.

In a particular example embodiment the second attachment member comprises a hinge pivotably joining the first and second segments. In a specific example the hinge comprises first and second bosses projecting respectively from the first and second segments. Each boss has an enlarged head at an end thereof. A ring surrounds the bosses and is positioned between the heads and the segments. By way of example the first and second bosses further comprise first and second lands. The lands are in facing relation and are angularly oriented with respect to one another.

DETAILED DESCRIPTION

Figure 1:
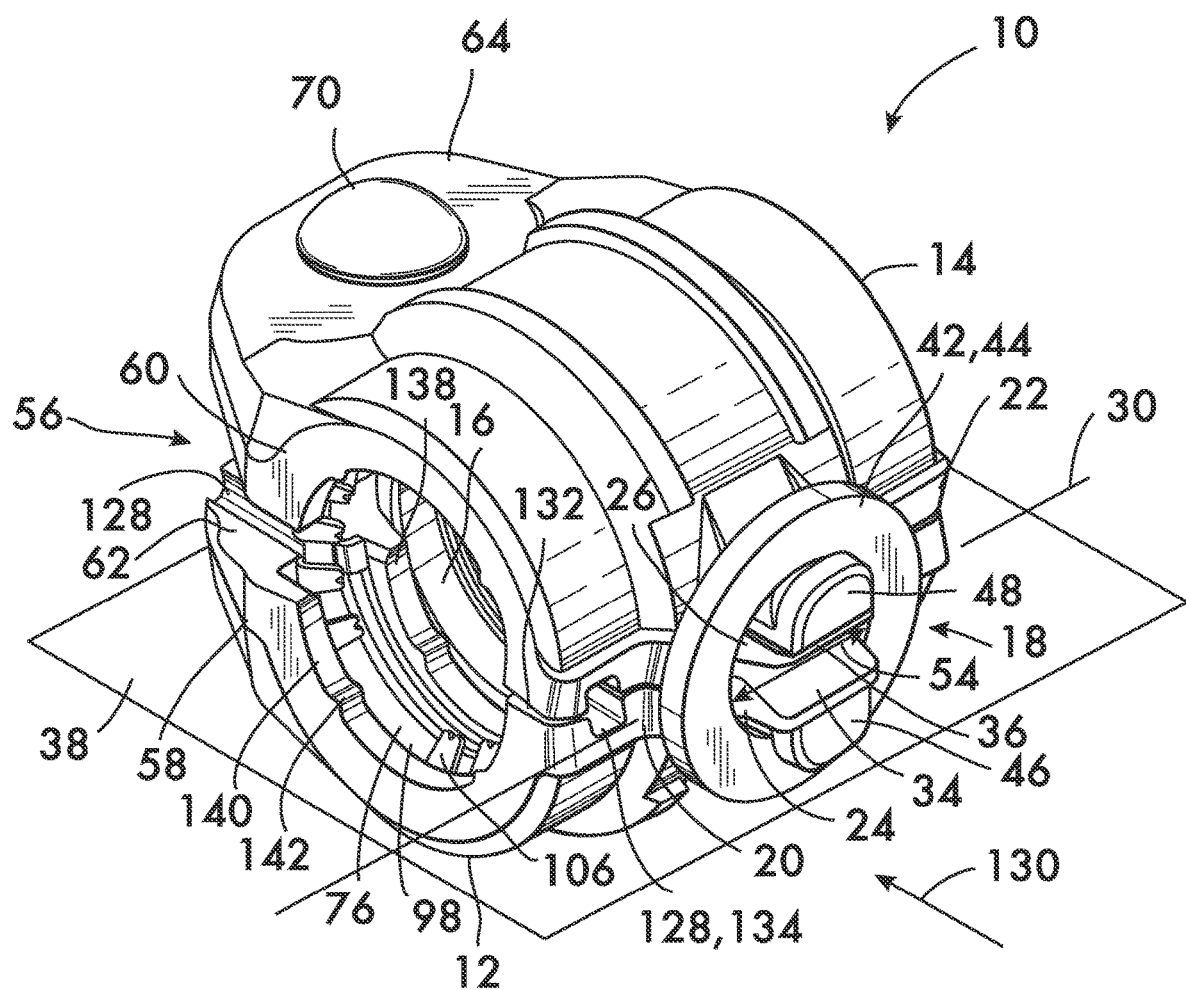
FIG. 1 is an isometric view of an example embodiment of a pipe coupling according to the invention.
Figure 1A:
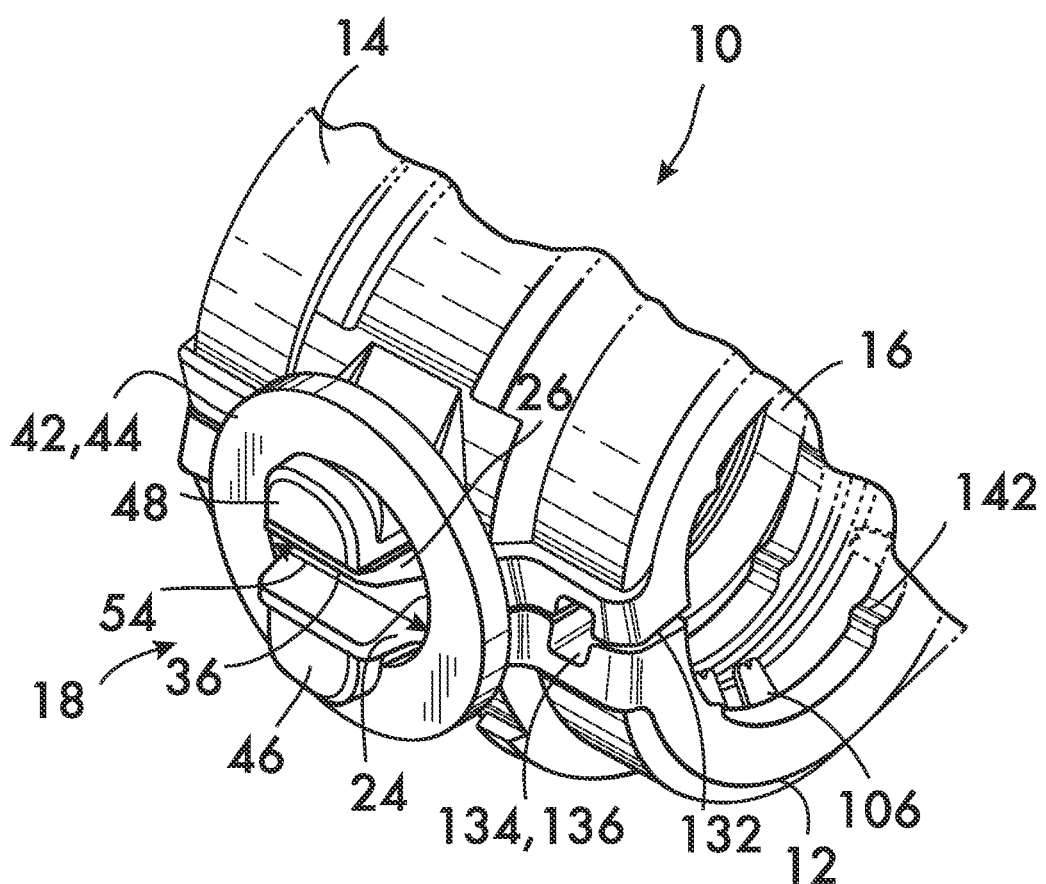
FIG. 1A is an isometric view of a portion of the example pipe coupling shown in FIG. 1.

An example embodiment of a coupling 10 according to the invention is shown in FIGS. 1 and 1A. Coupling 10 is for joining pipe elements and comprises first and second segments 12 and 14 positioned end to end surrounding a central space 16 for receiving the pipe elements. A spring assembly 18 joins a first end 20 of first segment 12 to a first end 22 of the second segment 14. The spring assembly 18 biases the segments 12 and 14 away from one another toward or into an open, pre-assembled state shown. When in this open or pre-assembled state, pipe elements can be inserted into the central space 16 without disassembling the coupling 10 as described below.

Figure 2:
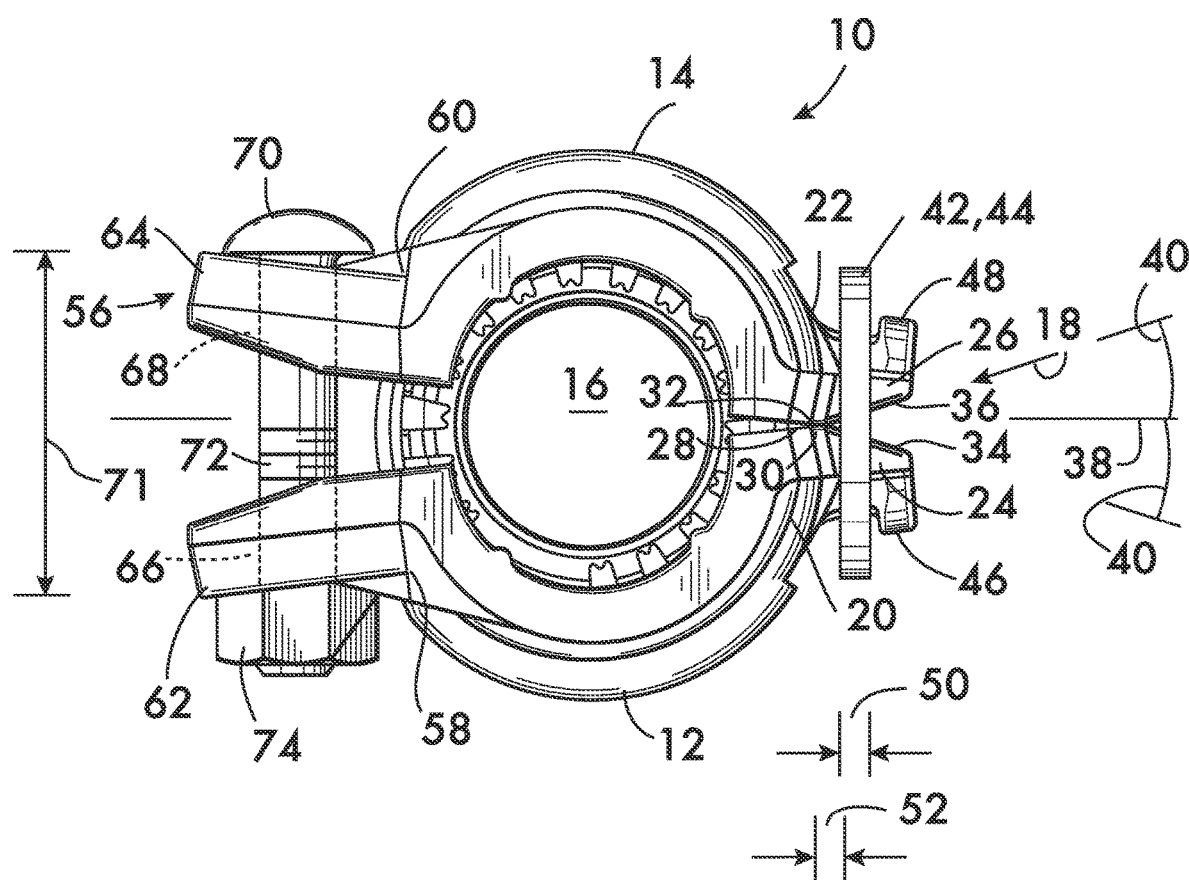
FIG. 2 is an axial view of the example pipe coupling shown in FIG. 1.

The example spring assembly 18 shown in FIGS. 1 and 2 comprises a first boss 24 projecting from the first end 20 of the first segment 12, and a second boss 26 projecting from the second end 22 of the second segment 14. The second boss 26 is positioned adjacent to the first boss 24. Bosses 24 and 26 are cantilevers and thus are substantially responsible for the biasing force of the spring assembly 18 as described below. A first fulcrum 28 is positioned on the first boss 24, the first fulcrum 28 contacting the second boss 26 and providing an axis 30 about which the segments 12 and 14 may pivot. In this example embodiment a second fulcrum 32 is positioned on the second boss 26. The second fulcrum 32 contacts the first fulcrum 28 to further define the pivot axis 30 about which the segments 12 and 14 pivot. First and second fulcrums 28 and 32 are defined in this example embodiment by first and second lands 34 and 36. The first and second lands 34 and 36 are respectively positioned on the first and second bosses 24 and 26, the first land 34 being contiguous with the first fulcrum 28, and the second land 36 being contiguous with the second fulcrum 32 (when present). At least the first land 34 is oriented angularly with respect to a plane 38 comprising the interface between the first and second segments 12 and 14. In this example embodiment both the first and second lands 34 and 36 are angularly oriented with respective orientation angles 40.

A link 42 extends between the first and second bosses 24 and 26. Link 42 captures the bosses, while permitting pivoting motion of the segments 12 and 14. In this example the link 42 comprises a ring 44 which encircles the first and second bosses 24 and 26. Ring 44 is retained on the bosses 24 and 26 by engagement with first and second heads 46 and 48 respectively projecting from the first and second bosses 24 and 26. Ring 44 and the bosses 24 and 26 cooperate to provide the spring biasing action of the spring assembly 18. The thickness 50 of the ring 44, the distance 52 between the fulcrums 28 and 32 and the point where the bosses 24 and 26 engage the ring 44, along with the area moment of inertia of the bosses, are parameters which will establish the spring constant of the spring assembly 18 and thus determine the amount of force necessary to close the coupling 10 and effect a joint. The angular orientation 40 of the lands 34 and 36 and the distance the fastener 70 has been tightened each act to set the maximum limit of separation between the segments 12 and 14, and the inner diameter 54 of the ring 44 determines the minimum separation of the segments when supported by an undeformed spring assembly 18 as shown in FIGS. 1 and 2. In one embodiment, the angular orientation 40 is such that, if the fastener 70 is not present (such as during the assembly of the coupling by the manufacturer) bosses 24, 26 may be brought near enough together that the inner diameter 54 of ring 44 will clear heads 46, 48, allowing ring 44 to be easily assembled over bosses 24, 26. Subsequent assembly and tightening of fastener 70 to a pre-determined distance 71 (see FIG. 2) acts to separate heads 46, 48 sufficient to retain ring 44 behind heads 46 and 58 as described above. The ring inner diameter 54 may be sized to hold the segments 12 and 14 in the open or pre-assembled state sufficient to permit insertion of pipe elements into the central space 16, or the diameter 54 may be larger, and permit the segments 12 and 14 to be supported in the open or pre-assembled state by other elements of the coupling as described below. In this situation the segments 12 and 14 will have some angular free play as the segments are drawn toward one another to close the coupling, the spring assembly 18 not immediately coming into effect upon pivoting of the segments.

Segments 12 and 14 are drawn toward one another by an adjustable attachment assembly 56. Attachment assembly 56 joins the second end 58 of the first segment 12 to the second end 60 of the second segment 14. Attachment assembly 56 is adapted to draw the segments 12 and 14 toward one another and into engagement with the pipe elements as described below. In this example the adjustable attachment assembly 56 comprises a first lug 62 attached to the second end 58 of the first segment 12, and a second lug 64 attached to the second end 60 of the second segment 14. Each lug 62, 64 defines a respective hole 66, 68 which receive a fastener 70 that extends between the lugs. In this example fastener 70 comprises a bolt 72 and a nut 74, which, when tightened, draw the segments 12 and 14 toward one another against the biasing force of the spring assembly 18.

Figure 3:
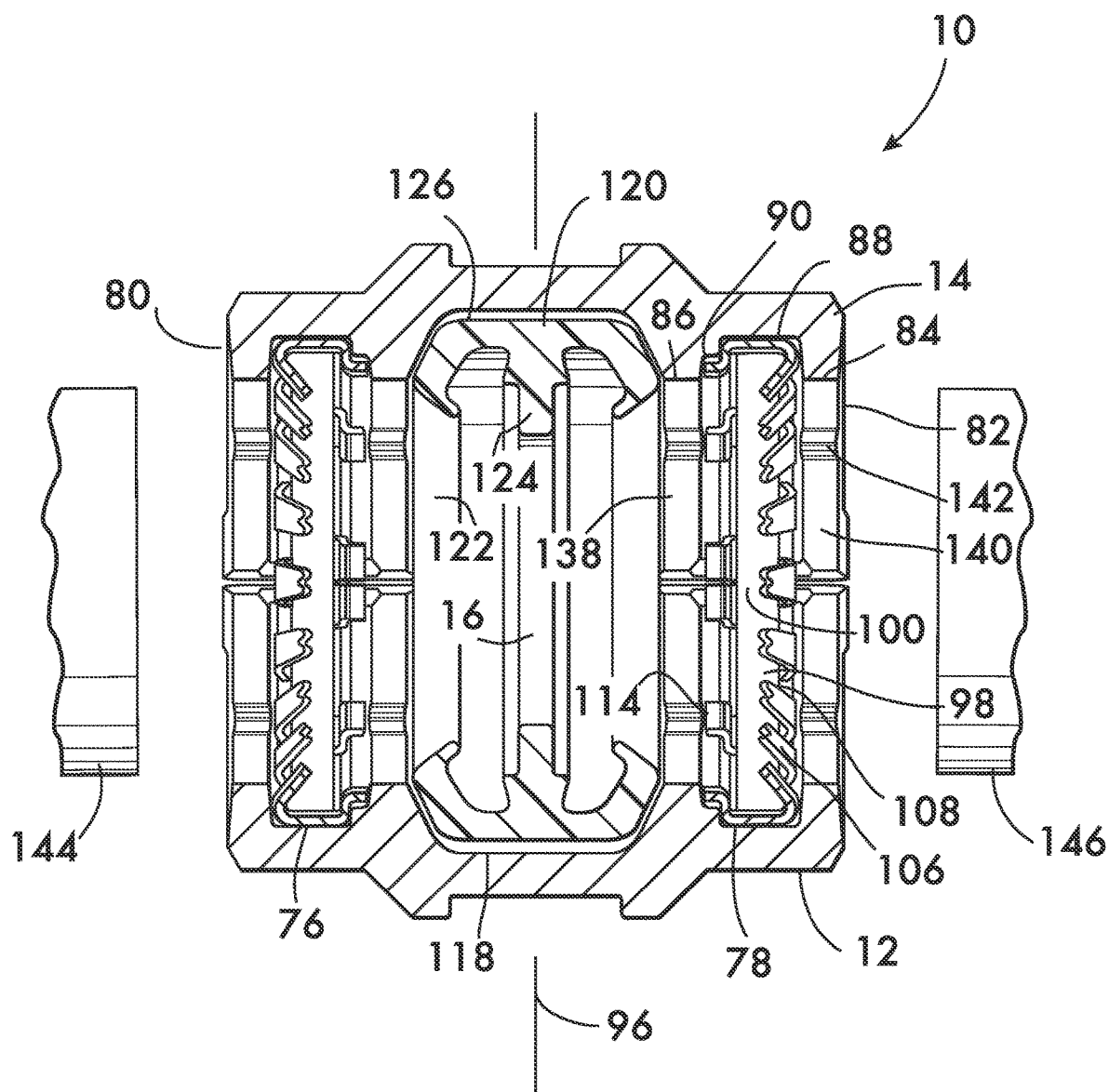
FIG. 3 is a sectional view of the example pipe coupling shown in FIG. 1.
Figure 4:
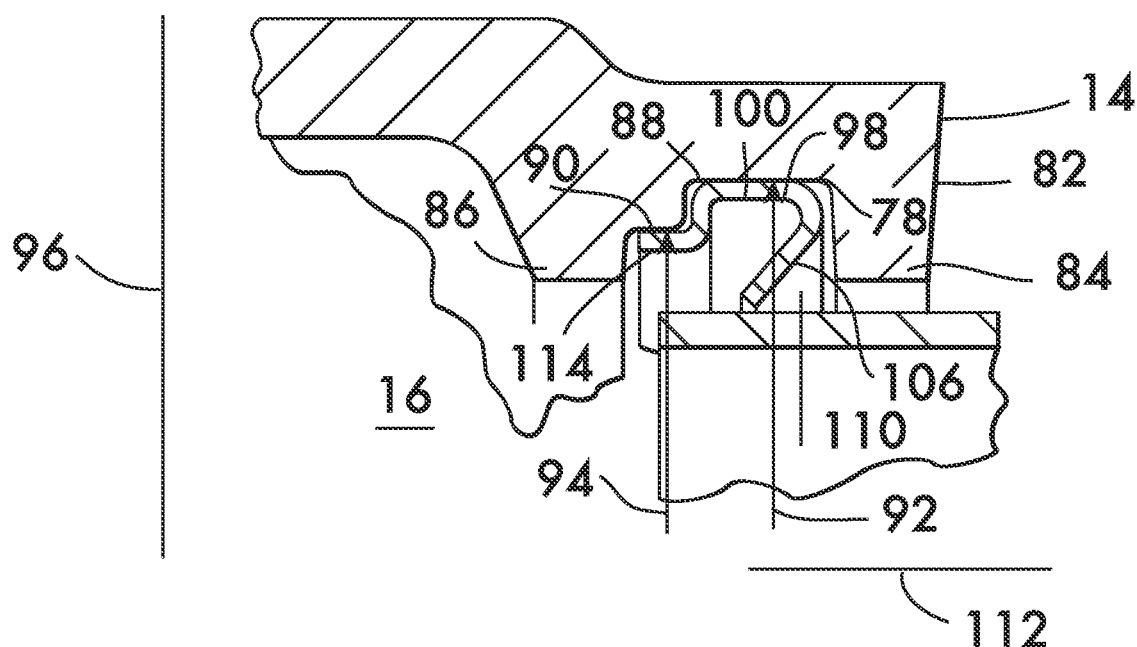
FIG. 4 is a partial sectional view of the example pipe coupling shown in FIG. 1.

As shown in cross section in FIG. 3, each segment 12 and 14 comprises first and second channels 76 and 78 respectively positioned on opposite sides 80 and 82 of each segment. The first and second channels 76 and 78 extend between the first and second ends 20 and 58 of the first segment 12, and the first and second ends 22 and 60 of the second segment 14 (see also FIG. 1). Channels 76 and 78 face the central space 16. As shown in detail in FIG. 4, each channel 76, 78 (channel 78 in segment 14 being shown) is defined by sidewalls 84 and 86 positioned in spaced relation to one another. Each channel 76, 78 furthermore has first and second floors 88 and 90 located between sidewalls 84 and 86. Floors 88 and 90 face the central space 16 and are arcuate in shape as they extend between the ends 20 and 58 and 22 and 60 of the segments 12 and 14. As shown in FIG. 4, first floor 88 is positioned closer to the side 82 of segment 14 and has a greater radius of curvature 92 than the second floor 90, which has a radius of curvature 94. As shown in FIG. 3, the channels 76 and 78 and the arrangement of their floors 88 and 90 are symmetric about an axis 96 extending transversely through the coupling 10.

As further shown in FIGS. 3 and 4, the channels 76 and 78 each receive a respective retainer 98. Retainer 98 is shown in detail in FIG. 5 and comprises an arcuate band 100 having oppositely disposed ends 102 and 104. Band 100 thus forms a "split ring" which, when compressed radially will deform to a smaller radius of curvature (see FIG. 7). In some embodiments, each band 100 is sized such that contact between bands 100 and the respective segments 12 and 14 within channels 76 and 78 allow one or both bands 100 to support segments 12 and 14 in spaced apart relation as shown in FIG. 1. A plurality of teeth 106 are positioned along one edge 108 of band 78. Teeth 106 project from band 100 toward the central space 16. As shown in FIGS. 3 and 4, teeth 106 are oriented angularly toward axis 96 with respect to a line 110 extending radially from an axis 112 arranged coaxially with the central space 16. The angular orientation is advantageous for retaining pipe elements as described below.

Figure 5:
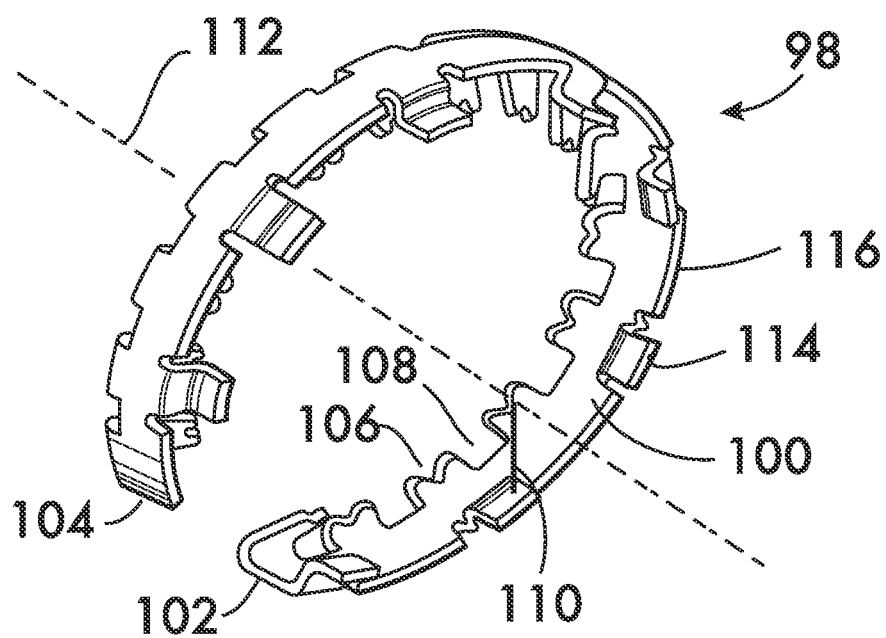
FIG. 5 is an isometric view of a component used in an example coupling.
Figure 6:
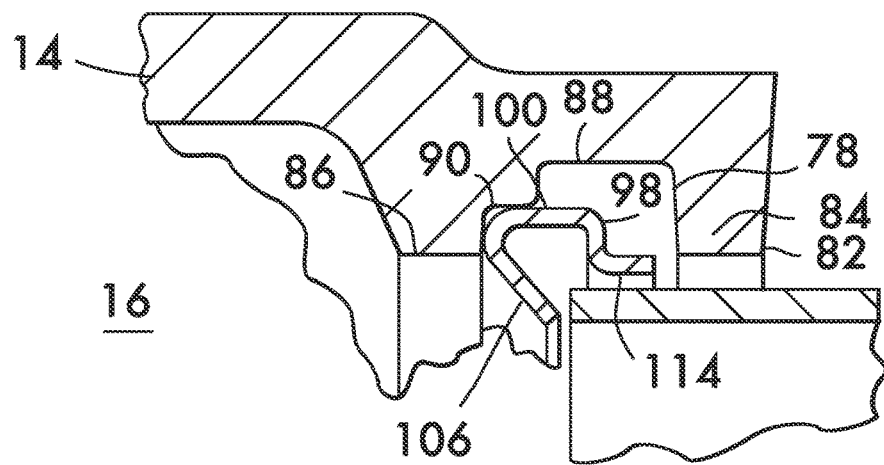
FIG. 6 is a partial sectional view of the example pipe coupling shown in FIG. 1.

As shown in FIG. 5, at least one, but in this example embodiment, a plurality of tabs 114 are positioned along an edge 116 oppositely disposed from edge 108. As shown in FIG. 4, the one or more tabs 114 are oriented substantially perpendicular to the line 110 and are offset from the band 100 toward axis 112 arranged coaxially with the central space 16. This offset of tabs 114 permits them to overlie the second floor 90, and the band 100 to overlie the first floor 88, when retainers 98 are properly received within respective channels 76 and 78 as shown in FIGS. 3 and 4. Proper assembly of the retainers 98 within the channels 76 and 78 permits pipe elements to be inserted into a pre-assembled coupling 10 as described below. However, as shown in FIG. 6, the channels 76 and 78 (78 shown) and the retainers 98 are sized such that if the coupling 10 is improperly assembled with the band 100 overlying the second floor 90 and the tab or tabs 114 overlying the first floor 88, the retainer's radius of curvature is smaller and teeth 106 effectively prevent insertion of the pipe element into the central space 16 with the segments 12 and 14 in spaced apart relation in the pre-assembled state. This cooperation between the retainer 98, its tabs 114, teeth 106, and the first and second floors 88 and 90 of channels 76 and 78 prevent improper assembly of a pipe joint using coupling 10. If the pipe elements could be inserted with the retainer teeth 106 facing in the wrong direction (FIG. 6) then the teeth will not be self-actuating against forces which would draw or push the pipe element out of the coupling. Thus the retainer would provide reduced mechanical restraint.

As shown in FIG. 3, segments 12 and 14 further comprise a third channel 118. Channel 118 is positioned between the first and second channels 76 and 78 and faces the central space 16. Channel 118 receives a ring seal 120 which ensures a fluid tight joint. Ring seal 120 is formed of a flexible, resilient material such as EPDM or other rubber compounds and has inner surfaces 122 sized to receive pipe elements when they are inserted into the central space 16 as described below. A pipe stop 124 is positioned between inner surfaces 122. The pipe stop projects into the central space 16 and limits insertion of pipe elements by engaging the pipe elements when they are inserted into coupling 10 to the desired depth. Ring seal 120 also has an outer surface 126 that may be sized to engage and support the segments 12 and 14 in spaced apart relation as shown in FIGS. 1 and 3. One or more of the bands 100 may also cooperate with the ring seal 120 to support the segments 12 and 14 in spaced apart relation. The separation of the segments 12 and 14, when supported by the ring seal 120 and/or band or bands 100, is sufficient to permit pipe elements to be inserted into the coupling when it is in its pre-assembled state (FIGS. 1, 2 and 3). FIG. 3 shows an example channel configuration wherein the second floors 90 are positioned between the first floors 88 and the third channel 118. In this example the tabs 114 project toward the third channel 118 when the retainers 98 are properly oriented within the coupling 10.

As shown in FIG. 1, coupling 10 further comprises a first aperture 128 in segment 12. In this example embodiment aperture 128 is aligned with the first channel 76 and provides a line of sight 130 toward the central space 16. In this example embodiment, aperture 128 is positioned at the interface 132 between segments 12 and 14 and is formed as a trough 134 in both segments 12 and 14. The troughs 134 in each of the segments 12 and 14 are aligned so that when the segments are drawn into engagement they provide a view toward the central space 16 to permit visual confirmation that the retainer is present and that a pipe element is present within the central space and seated at least past the retainer. As shown in FIG. 1A, a second aperture 136 is also positioned in at least one of the segments 12 and 14. The second aperture 136 is aligned with the second channel 78 in this embodiment (see FIG. 3) and also provides a line of sight toward central space 16. Again, in the example embodiment 10 illustrated, the second aperture 136 is positioned between the segments 12 and 14. Aperture 136 is also formed by troughs 134 at the interface 132 between the segments 12 and 14. The second aperture also permits visual confirmation that a pipe element is present within the central space 16.

As shown in FIGS. 1 and 3, each segment 12 and 14 also comprises first and second arcuate surfaces 138 and 140 respectively positioned on sidewalls 84 and 86. Arcuate surfaces 138 and 140 face the central space 16 and a plurality of projections 142 may be positioned on each arcuate surface 138, 140. Projections 142 are arranged in spaced relation to one another along the arcuate surfaces 138 and 140 and project toward the central space 16. As described below, projections 142 engage the pipe elements and increase joint stiffness and accommodate a wider tolerance range on the pipe outer diameter.

When projections 142 are forced into engagement with the pipe elements as the segments 12 and 14 are drawn toward one another they add stiffness to the joint between the coupling 10 and the pipe elements upon their engagement with the outer surfaces of the pipe elements. Additionally, the projections 142 allow the coupling 10 to accommodate a larger pipe outer diameter tolerance in combination with known manufacturing tolerances for coupling 10. When the outer diameter of pipe elements is near the small end of the tolerance range the presence of the projections 142 ensures mechanical engagement between the coupling 10 and the pipe elements. However, when the pipe diameter is at the large end of the tolerance range the projections will tend to deform the outer surface of the pipe elements locally, and projections 142 may also deform. For couplings 10 used with plain end pipe elements this is particularly advantageous as plain end couplings are typically designed so that the arcuate surfaces 138, 140 (see FIG. 3) do not engage the outer surfaces of the pipe elements. This arrangement ensures that the clamping force provided by the fastener 70 (see FIG. 2) is fully applied to the retainers 98. Were the arcuate surfaces 138, 140 of the coupling 10 to engage the pipe outer surface directly, the clamping force would be divided between contact of the arcuate surfaces with the pipe and contact between the retainers 98 and the pipe elements. Because the surface areas of projections 142 are small relative to the arcuate surfaces 138, 140, and contact the pipe element outer surface only at discrete points, only minimal clamping force from the fastener 70 needs to be diverted into contact between the projections 142 and the pipe elements to provide enhanced stiffness without compromising the axial retention provided by the retainers 98. Projections 142 are advantageous in that they achieve greater rigidity even with the lesser clamping force available with the single fastener design of the coupling 10. The single fastener 70 acts in conjunction with the spring assembly 18 to ensure that adequate clamping force is applied to the pipe elements.

Figure 7:
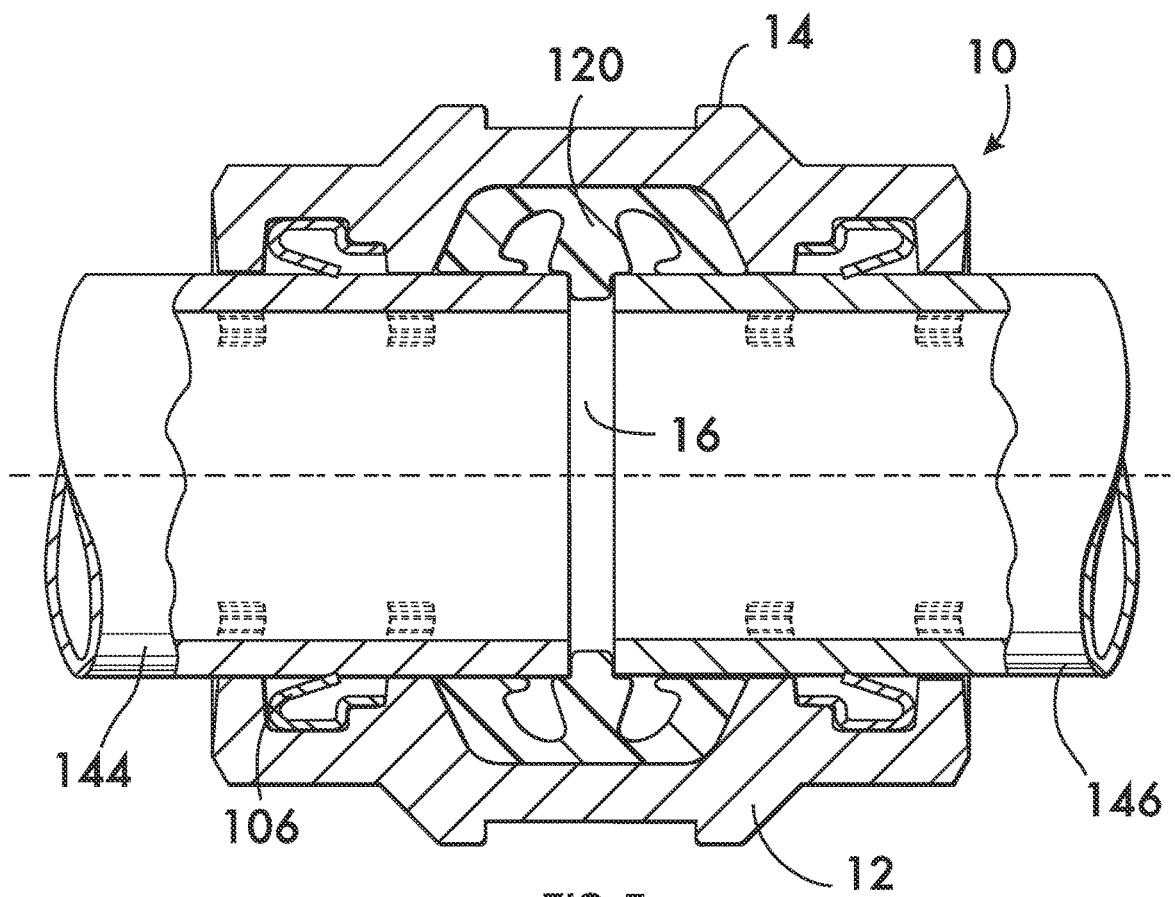
FIG. 7 is a sectional view of the example pipe coupling shown in FIG. 1.
Figure 8:
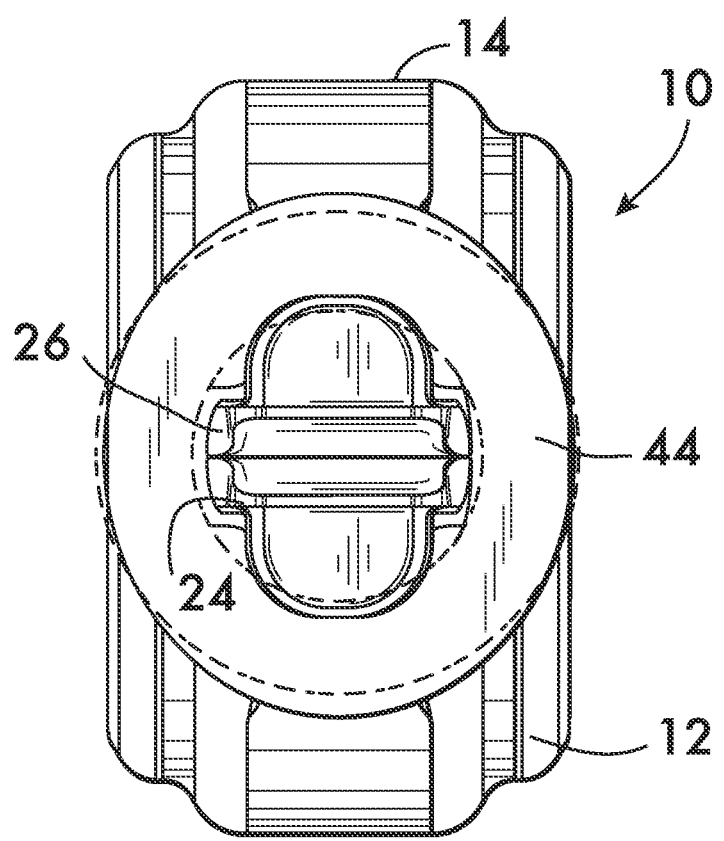
FIG. 8 is an end view of the example pipe coupling shown in FIG. 1.

Operation of coupling 10 is illustrated in FIGS. 1, 3, 7 and 8. With the coupling 10 in the pre-assembled state as shown in FIGS. 1 and 3, pipe elements 144 and 146 are inserted into the central space 16. The pipe elements clear the teeth 106 of retainers 98, engage and the inner surfaces 122 of ring seal 120, and engage the pipe stop 124. Next, the fastener 70 is tightened (see also FIG. 2) drawing the segments 12 and 14 toward one another. As shown in FIG. 7 the ring seal 120 and the teeth 106 are compressed between the segments 12 and 14 and the pipe elements 144 and 146. Pivoting motion of the segments about fulcrums 28 and 32 (see FIG. 2) is resisted by the biasing force of the spring assembly 18. As shown in FIG. 8, the elements comprising the spring assembly, in this example, the bosses 24 and 26 and the ring 44, deform in proportion to the spring force, with the ring 44 extending into an oval shape and the bosses 24 and 26 bending as cantilevers (deformed shapes shown in solid line, undeformed in broken line). Apertures 128, 136 may be used to visually confirm that the pipe elements are present in the coupling 10.

Figure 9:
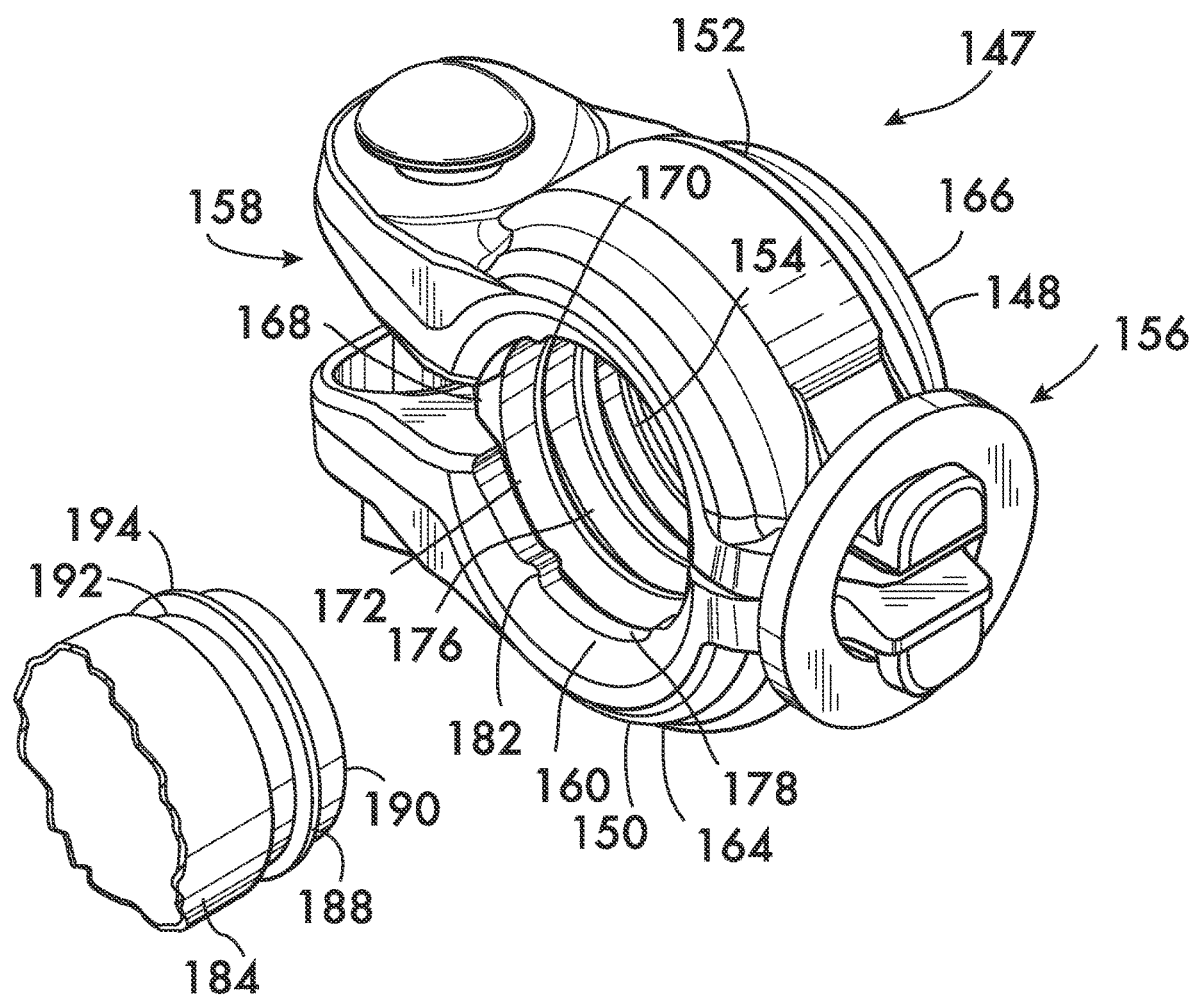
FIG. 9 is an exploded isometric view of an example preassembled combination coupling and pipe element according to the invention.
Figure 9A:
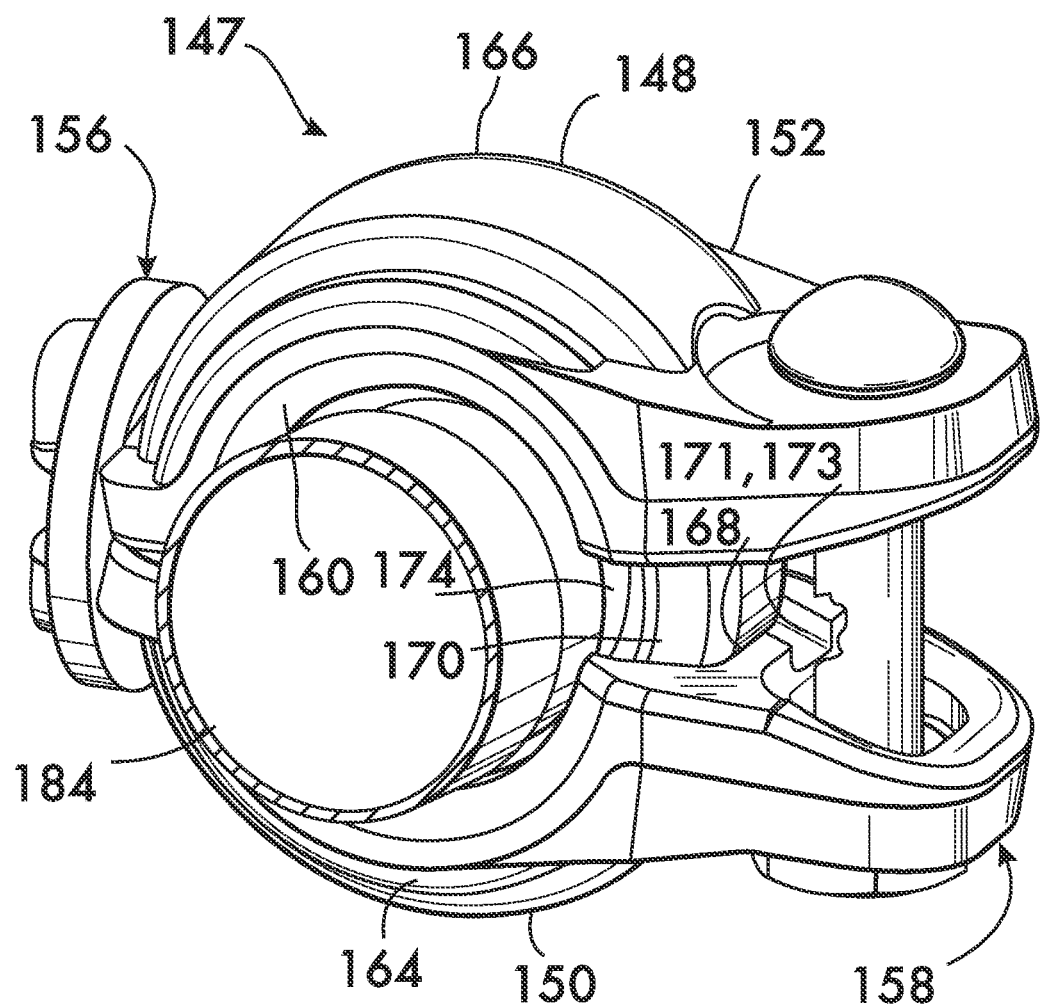
FIG. 9A is an isometric view of the example combination of FIG. 9 shown in a preassembled state.

FIG. 9 shows an exploded view, and FIG. 9A shows an assembled view, of a preassembled combination coupling and pipe element 147 according to the invention. The combination coupling and pipe element 147 comprises a coupling 148 and a first pipe element 184, and is used to couple a second pipe element 186 to the first pipe element (see FIGS. 10 and 11). The second pipe element 186 may, for example, be part of a piping network (not shown), and the first pipe element 184 may be part of another assembly, such as a flexible hose for a fire suppression sprinkler, or an inlet or and outlet of a pump or a valve to cite a few examples.

The coupling 148 comprises first and second segments 150 and 152 positioned end to end surrounding a central space 154 for receiving pipe elements. A spring assembly 156 and an adjustable attachment assembly 158, as described above for coupling 10, join the ends of the segments. Coupling 148 further comprises first and second shoulders 160 and 162 (see also FIG. 10) positioned on opposite sides 164, 166 of each segment 150 and 152. Shoulders 160 and 162 extend lengthwise along the segments 150 and 152 and project toward the central space 154. Shoulders 160 and 162 define a channel 168 which extends between the ends of the segments 150 and 152 and faces central space 154. Channel 168 receives a ring seal 170 for a fluid tight joint. Ring seal 170 has an inner surface 172 sized to receive pipe elements (see also FIG. 10) and an outer surface 174 which may be sized to support the segments 150 and 152 in the preassembled state, i.e., in spaced relation sufficient to insert the second pipe element 186 into the central space 154 without disassembling the combination 147. FIG. 9A shows the coupling in the preassembled state with the segments 150 and 152 in spaced relation. As described above for coupling 10, the spring assembly 156 may also be used to bias the segments 150 and 152 into the open, preassembled state shown in FIG. 9A. Ring seal 170 may also comprise a pipe stop 176 positioned between the inner surfaces 172. Pipe elements inserted into the central space engage the pipe stop 176 when properly seated (see FIG. 11).

Figure 10:
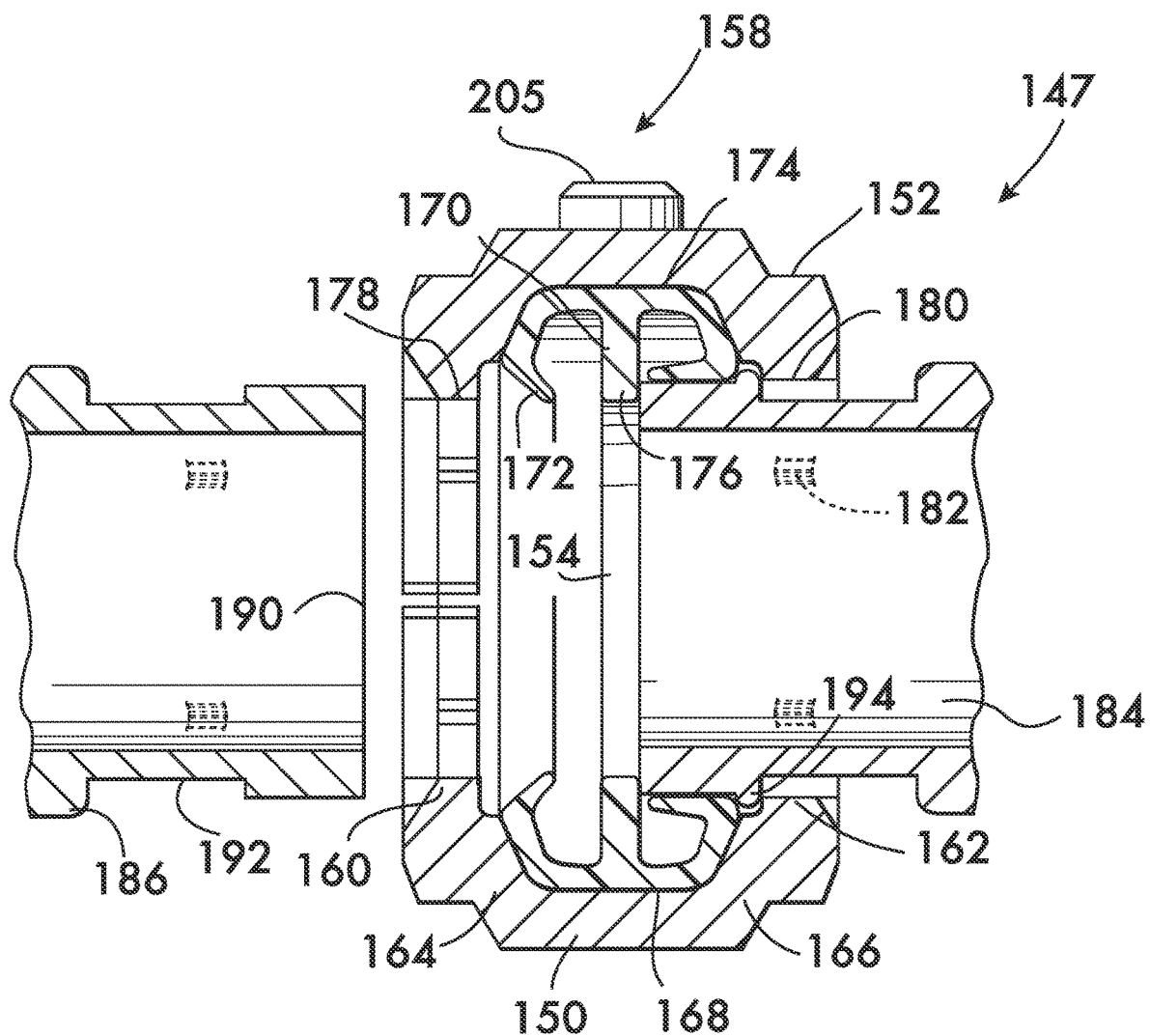
FIGS. 10 and 11 are sectional views of the example combination shown in FIG. 9 illustrating assembly of a pipe joint.

As shown in FIGS. 9 and 10, each segment 150 and 152 further comprises a first arcuate surface 178 positioned on the first shoulder 160 and a second arcuate surface 180 positioned on the second shoulder 162. Arcuate surfaces 178 and 180 face the central space 154. A plurality of projections 182 may be positioned on the arcuate surfaces 178 and 180. Projections 182 are arranged in spaced relation to one another along the arcuate surfaces 178 and 180 and project toward the central space 154. Projections 182 engage the pipe elements and increase joint stiffness and accommodate a wider tolerance range on the pipe outer diameter. As shown in FIG. 9A, the coupling 148 may have at least one aperture 171 in one of the segments 150, 152. In this example the aperture 171 comprises a trough 173 positioned at an interface between the first and second segments 150 and 152.

As shown in FIG. 9, the first pipe element 184 comprises a rim 188 which projects outwardly from the first pipe element and extends circumferentially around. Rim 188 is positioned in spaced relation to an end 190 of the first pipe element 184, and as shown in FIGS. 9A and 10, is captured within the central space 154 by engagement with the shoulder 162. Rim 188 may be defined by a circumferential groove 192 in the first pipe element 184, or a circumferential bead 194 which projects radially outwardly from the first pipe element 184. In the example embodiment shown in FIG. 9, the rim 188 is defined by both the groove 192 and the bead 194.

Figure 9B:
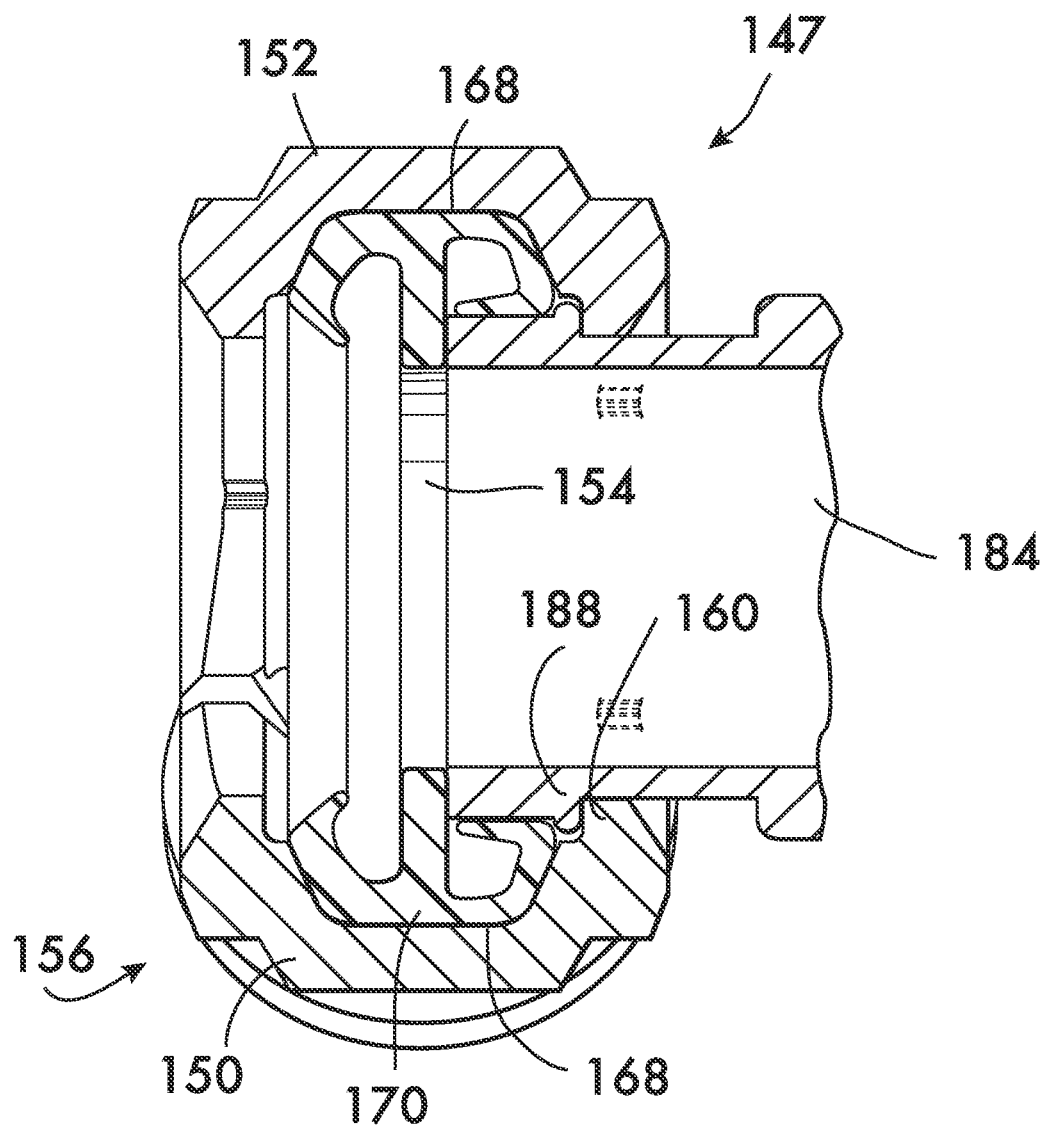
FIG. 9B is a sectional view of the example combination shown in FIG. 9.
Figure 9C:
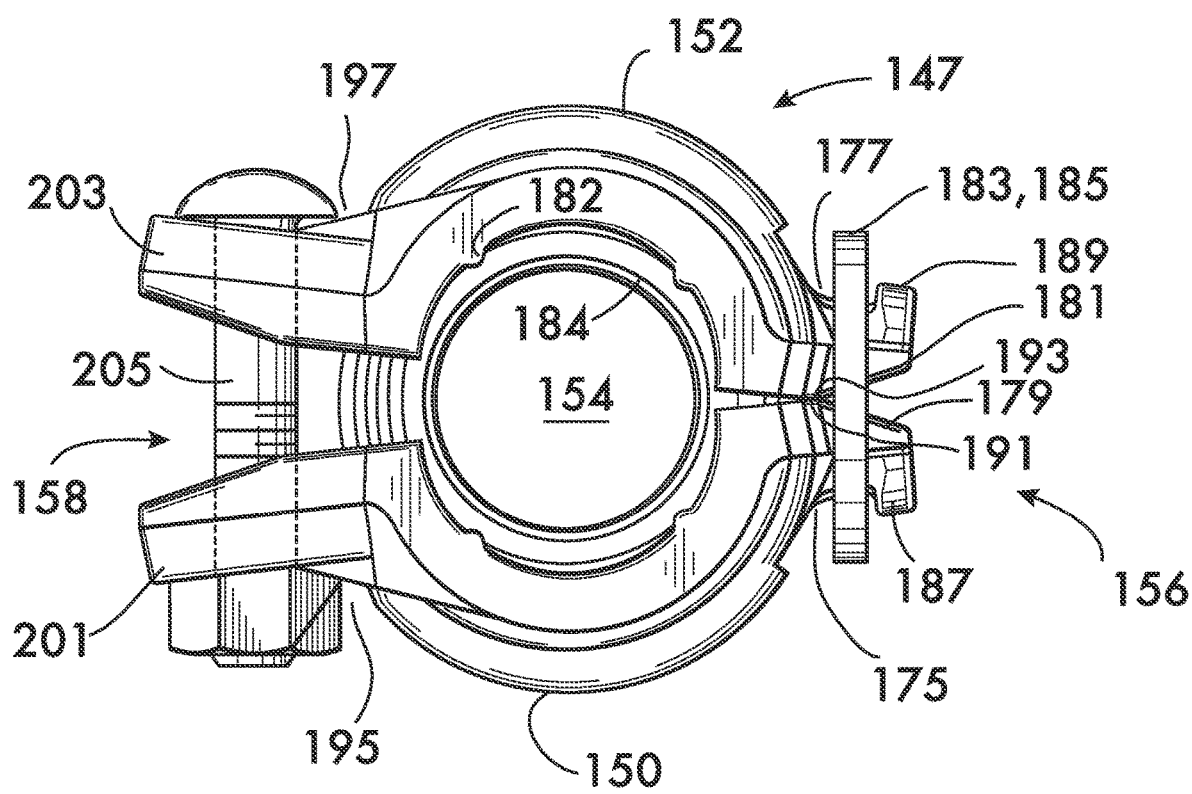
FIG. 9C is an axial view of the example combination shown in FIG. 9.

The preassembled combination coupling and pipe element 147 shown in FIG. 9A in its preassembled state is assembled as illustrated in FIGS. 9B and 9C. The first pipe element 184 is engaged with the ring seal 170. The ring seal 170 is then positioned within the channel 168 of the first segment 150 while the rim 188 is engaged with the first shoulder 160 within what will become the central space 154. Next the spring assembly 156 is formed by engaging the first end 175 of the first segment 150 with the first end 177 of the second segment 152. In the example shown, engagement of the first ends 175 and 177 is effected by joining a first boss 179 projecting from the first end 175 of the first segment 150 with a second boss 181 projecting from the first end 177 of the second segment 152 and pivotably linking them together using a link 183. In this example the link 183 comprises a ring 185 into which the bosses 179 and 181 are inserted, each boss having a respective head 187, 189 which retain the bosses within the ring 185 when the segments are pivoted into the preassembled state. As shown in FIG. 9C, the second boss 181 is contacted by a fulcrum 191 on the first boss 179, and the first boss 179 is contacted by a fulcrum 193 on the second boss 181. The bosses 179 and 181 joined by the ring 185 act as cantilever springs which bias the segments 150 and 152 away from one another and can also be used to support the segments in spaced apart relation, either alone or in combination with the ring seal 170 as described above. Next the second end 195 of the first segment 150 is attached to the second end 197 of the second segment 152 using the adjustable attachment assembly 158. In this example embodiment the adjustable attachment assembly comprises a first lug 201 mounted on the second end 195 of the first segment 150, a second lug 203 mounted on the second end 197 of the second segment 152, and a fastener 205 extending between the first and second lugs.

Working together with the spring assembly 156 (and/or the ring seal 170), initial tightening of the fastener 205 holds the segments 150 and 152 in the preassembled state shown in FIGS. 9A and 9C. In this configuration the segments 150, 152 are supported in spaced apart relation sufficient to permit the second pipe element 186 to be inserted into the central space 154 (see FIGS. 10-11) while also capturing the first pipe element 184 by engagement between the shoulder 160 and the rim 188. As shown in FIG. 9C, the projections 182 increase the ability of the segments 150, 152 to retain the first pipe element 184 when the combination 147 is in the preassembled state.

Figure 11:
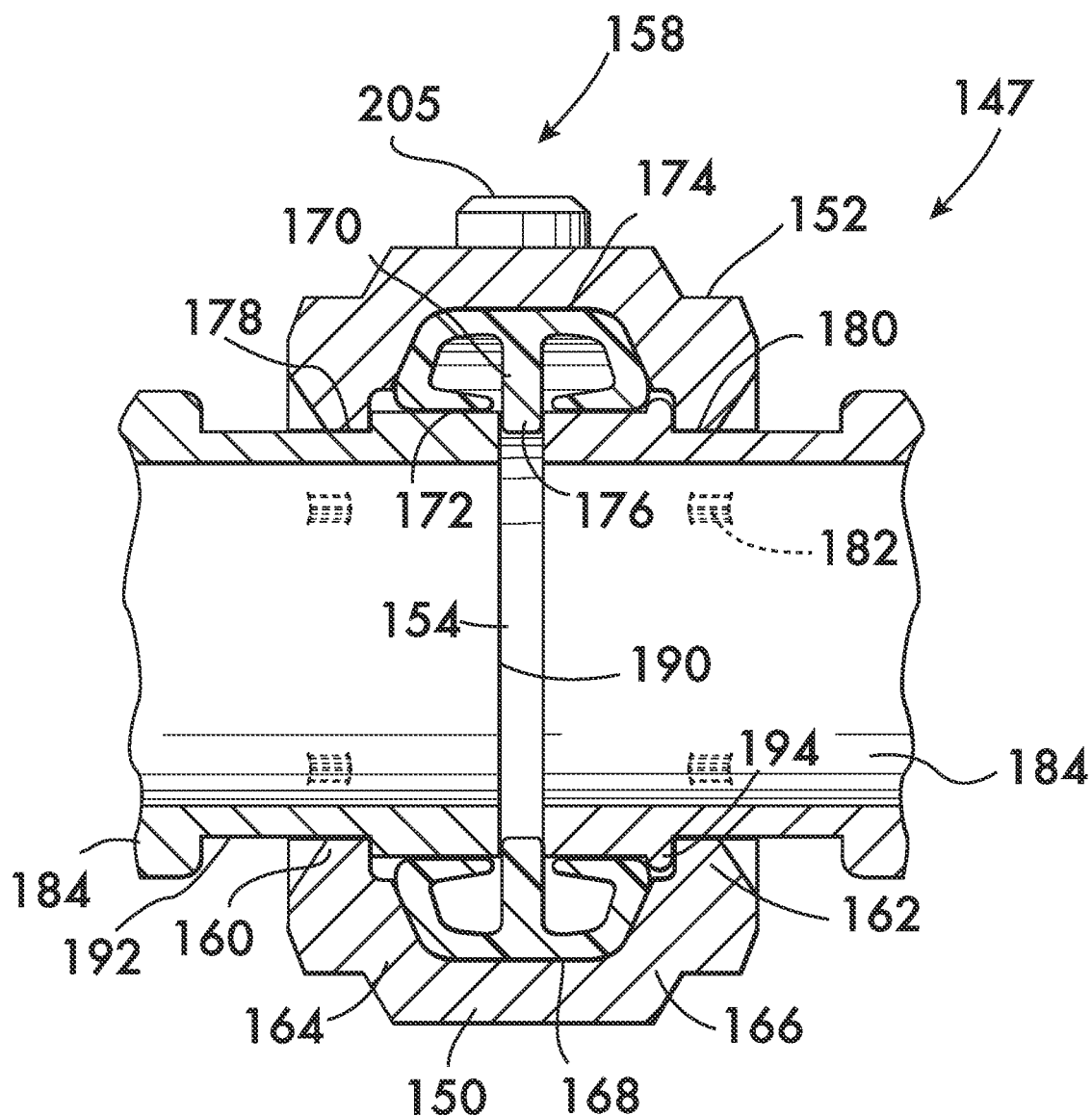

FIGS. 10 and 11 illustrate use of the combination 147 to join pipe elements 184 and 186. As shown in FIG. 10, with the combination 147 in the preassembled state the second pipe element 186 is inserted into the central space 154. Upon insertion the second pipe element 186 engages with surface 172 on the ring seal 170 (the first pipe element 184 is similarly engaged with the ring seal). As shown in FIG. 11, the segments are then drawn toward one another using the adjustable attachment assembly 158. In this example the fastener 205 is tightened, drawing the segments 150 and 152 against the biasing force of the spring assembly 156 (see FIG. 9C) and compressing the ring seal 170 to form a fluid tight joint. If projections 182 are present they engage the pipe elements 184, 186, otherwise, the arcuate surfaces 178 and 180 engage the pipe elements. FIG. 11 shows the arcuate surface 178 engaging a groove 192 in the second pipe element 186.

Figure 12:
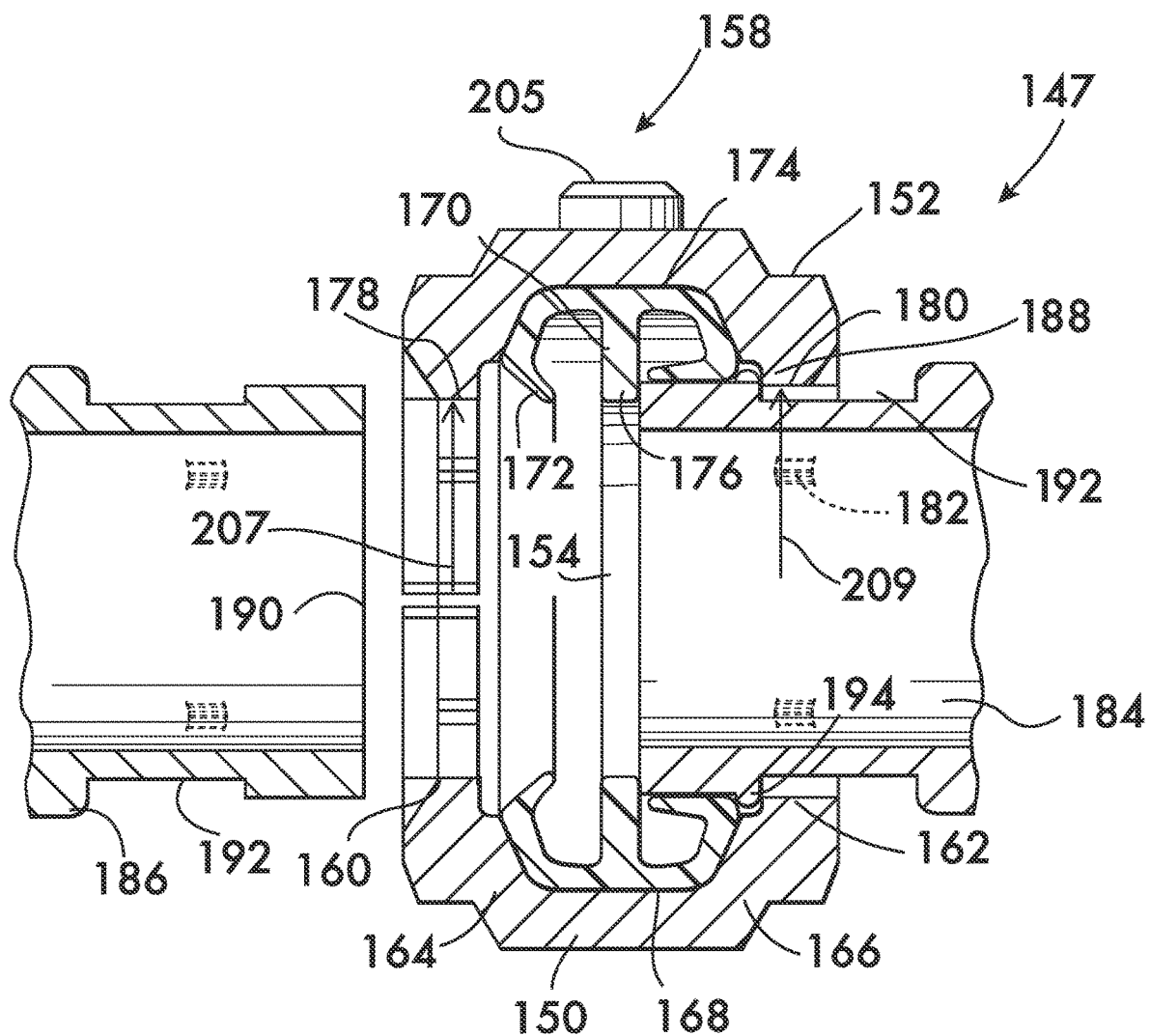
FIG. 12 is a sectional view of an example preassembled combination coupling and pipe element.

FIG. 12 shows an embodiment of the preassembled combination 147 wherein the first arcuate surface 178 has a first radius of curvature 207 and the second arcuate surface 180 has a second radius of curvature 209. In this example embodiment the second radius of curvature 209 is less than the first radius of curvature 207. This configuration of radii is appropriate when rim 188 of the first pipe element is defined by a groove 192 because it permits the first pipe element 184 to be captured by coupling 148 when it is in the preassembled state, while allowing the second pipe element 186 to be inserted into the central space 154 without disassembling the coupling. The groove 192 in the first pipe element 184 may be deeper than the groove 192 in the second pipe element 186 to accommodate this embodiment.

The use of the combination 147 having a single fastener 205 and a captured pipe element 184 provides significant advantage by increasing the stability of the coupling on the pipe elements through engagement between the coupling shoulder and the rim of the pipe element. The presence of the spring assembly and single fastener significantly inhibit the ability to manipulate the coupling by rocking it, making it much more difficult to separate the pipe element from the coupling. The single fastener also simplifies the tightening step, as only one fastener need be tightened, as opposed to two fasteners, which must be tightened in an alternating sequence to avoid damage to the ring seal.

Couplings according to the invention are expected to improve the efficiency of installation and the reliability of joints formed. Further expected advantages include a lighter weight coupling which has a lower external profile and which is smaller for a given pipe size. Having only one fastener reduces the part count and contributes to reduced errors during assembly, as well as eliminating the need to tighten more than one fastener in an alternating sequence.

Figure 13:
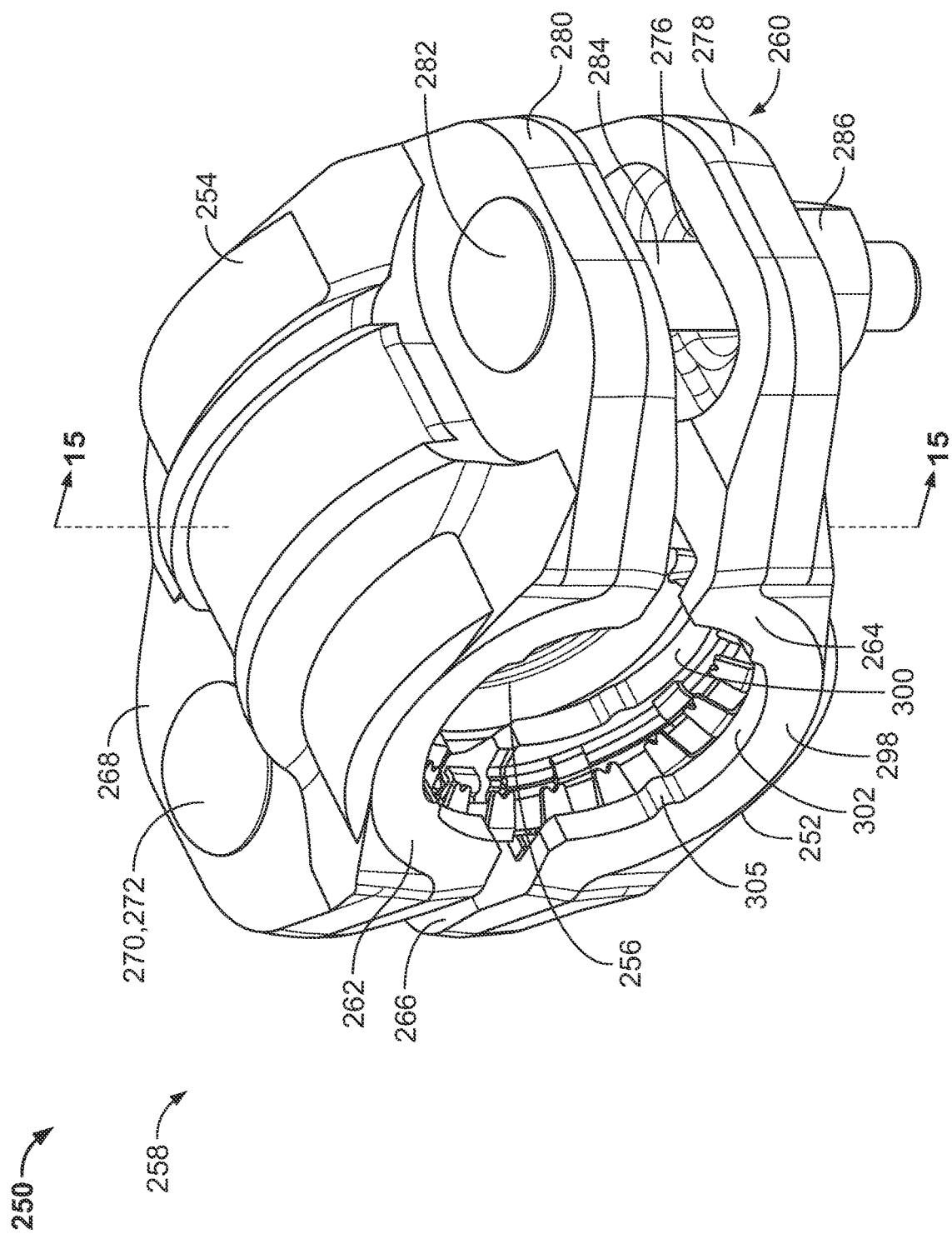
FIG. 13 is an isometric view of an example embodiment of a coupling according to the invention.
Figure 14:
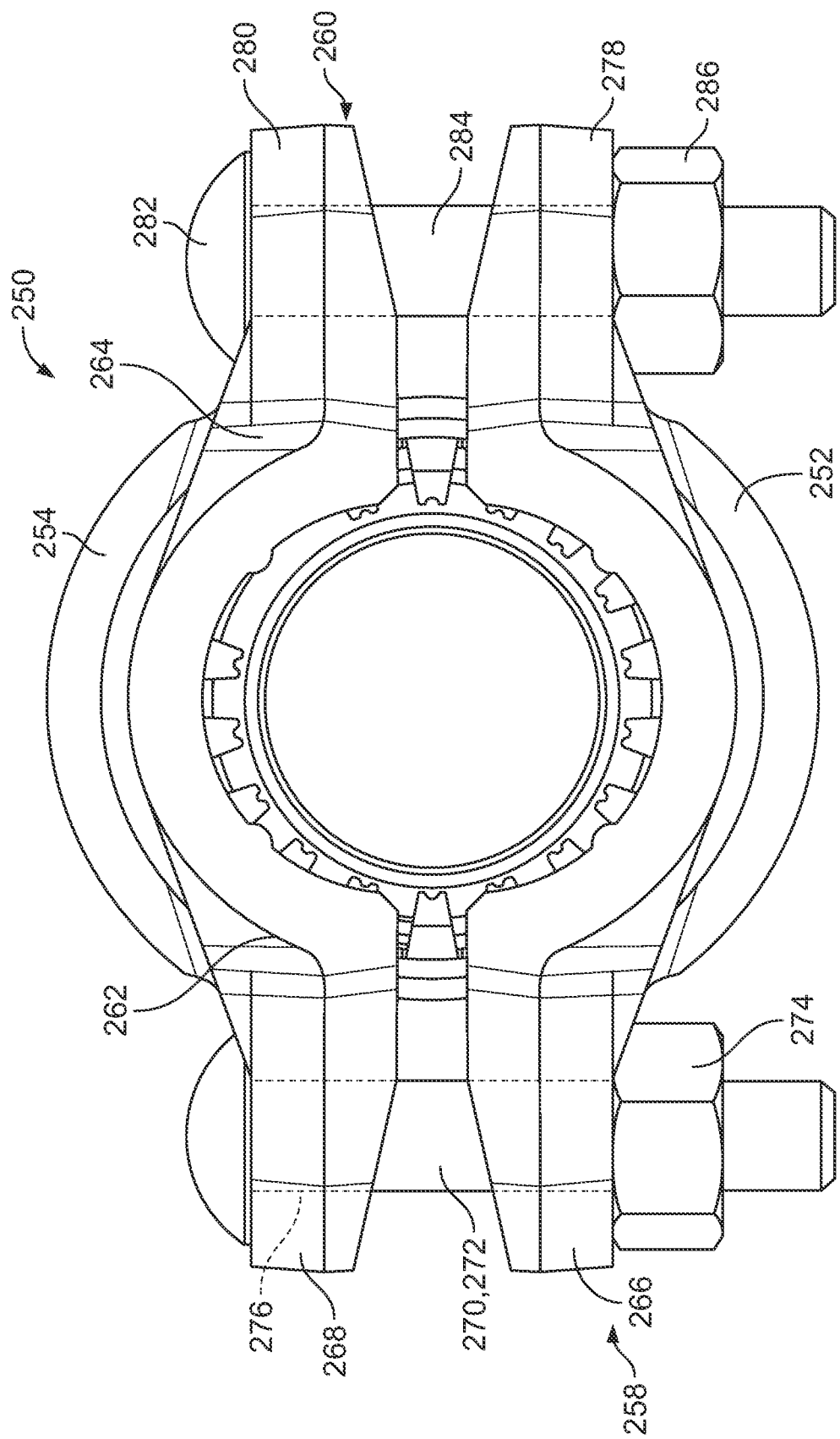
FIG. 14 is an axial view of the example coupling shown in FIG. 13.

FIGS. 13 and 14 show an example coupling 250 according to the invention. Coupling 250 comprises first and second segments 252 and 254 attached to one another surrounding a central space 256. Attachment of segments 252 and 254 is effected by first and second attachment members 258 and 260 positioned at respective opposite ends 262 and 264 of segments 252 and 254. In this example embodiment the first attachment member 258 comprises first and second lugs 266 and 268, and a fastener 270 comprising a bolt 272 and a nut 274 (see FIG. 14). Lugs 266 and 268 are in facing relation to one another and extend from ends 262 of respective segments 252 and 254. The lugs have holes 276 which receive a first fastener 270, the fastener extending between the first and second lugs. Comprised of lugs 266, 268 and fastener 270, the first attachment member is adjustably tightenable for drawing the segments 252 and 254 toward one another to join pipe elements as described below. Further in this example embodiment, the second attachment member 260 comprises third and fourth lugs 278 and 280, and a second fastener 282 comprising a bolt 284 and a nut 286. Lugs 278 and 280 are in facing relation to one another and extend from ends 264 of respective segments 252 and 254. The lugs have holes 276 which receive a second fastener 282, the fastener extending between the third and fourth lugs. Comprised of lugs 278, 280 and fastener 282, the second attachment member is also adjustably tightenable for drawing the segments 252 and 254 toward one another to join pipe elements as described below.

Figure 15:
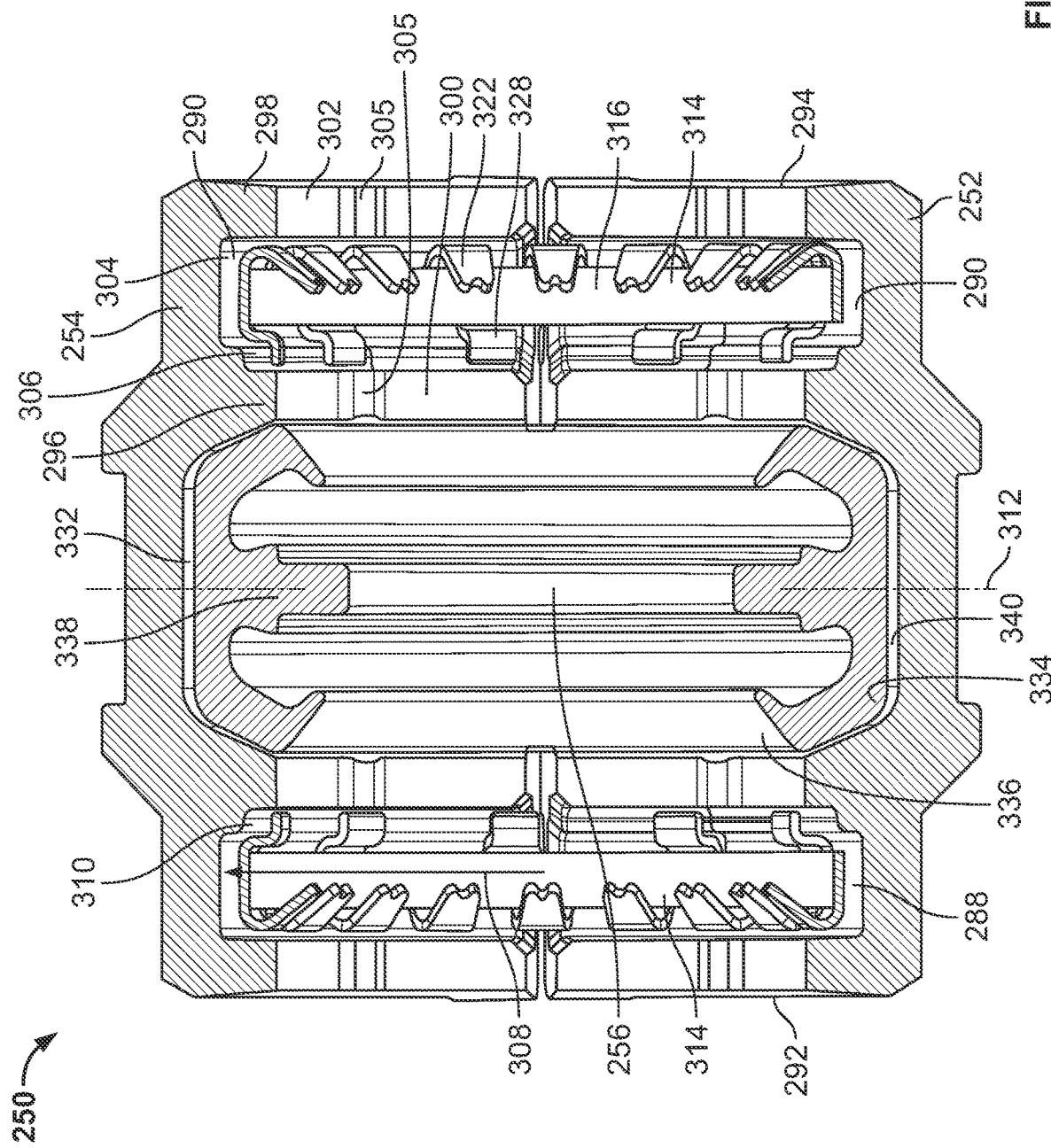
FIG. 15 is a cross sectional view taken at line 15-15 of FIG. 13.
Figure 16:
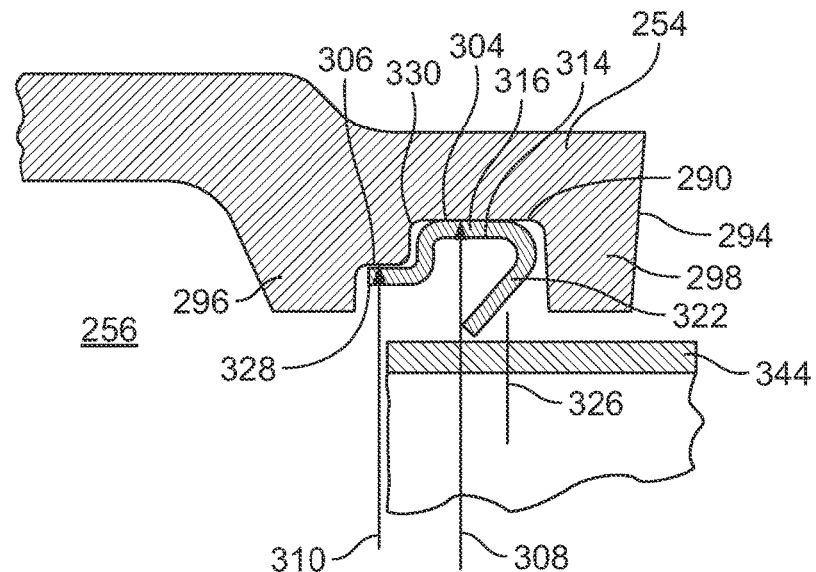
FIG. 16 is a partial sectional view of a portion of the example coupling shown in FIG. 13.

As shown in cross section in FIG. 15 each segment 252 and 254 comprises first and second channels 288 and 290 respectively positioned on opposite sides 290 and 294 of each segment. The first and second channels 288 and 290 extend between the ends 262 and 264 of segments 252 and 254 (see FIG. 13) and face the central space 256. As shown in detail in FIG. 16, each channel 288, 290 (channel 290 in segment 254 being shown) is defined by sidewalls 296 and 298 positioned in spaced relation to one another. Each channel 288, 290 furthermore has first and second floors 304 and 306 located between sidewalls 296 and 298. Floors 304 and 306 face the central space 256 and are arcuate in shape as they extend between the ends 262 and 264 of the segments 252 and 254. As shown in FIG. 16, first floor 304 is positioned closer to the side 294 of segment 254 and has a greater radius of curvature 308 than the second floor 306, which has a radius of curvature 310. As shown in FIG. 15, the channels 288 and 290 and the arrangement of their floors 304 and 306 are symmetric about the axis 312 extending transversely through the coupling 250.

As further shown in FIGS. 15 and 16, the channels 288 and 290 each receive a respective retainer 314. Retainer 314 is shown in detail in FIG. 17 and comprises an arcuate band 316 having oppositely disposed ends 318 and 320. Band 316 is thus forms a "split ring" which, when compressed radially will deform to a smaller radius of curvature. In some embodiments, each band 316 is sized such that contact between bands 316 and the respective segments 252 and 254 within channels 288 and 290 allow one or both bands 316 to support segments 252 and 254 in spaced apart relation as shown in FIG. 13. A plurality of teeth 322 are positioned along one edge 324 of band 316. Teeth 322 project from band 316 toward the central space 256. As shown in FIG. 16, teeth 322 are oriented angularly toward axis 312 with respect to a radius 326 extending from the central space. The angular orientation is advantageous for retaining pipe elements as described below.

Figure 17:
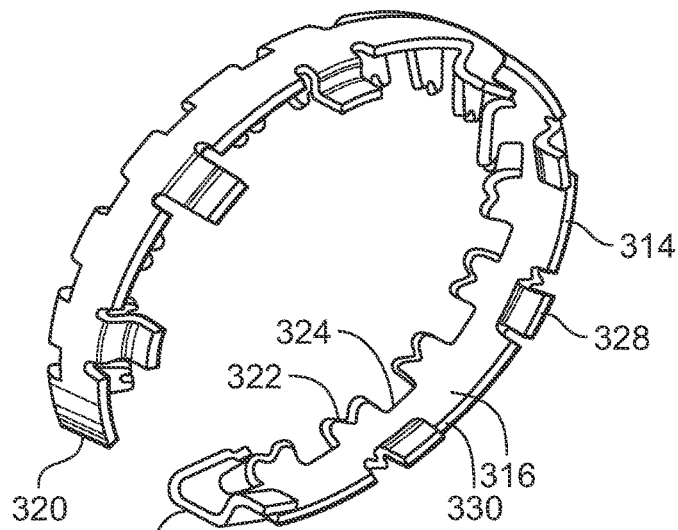
FIG. 17 is an isometric view of an example retainer used with the example coupling of FIG. 13.
Figure 18:
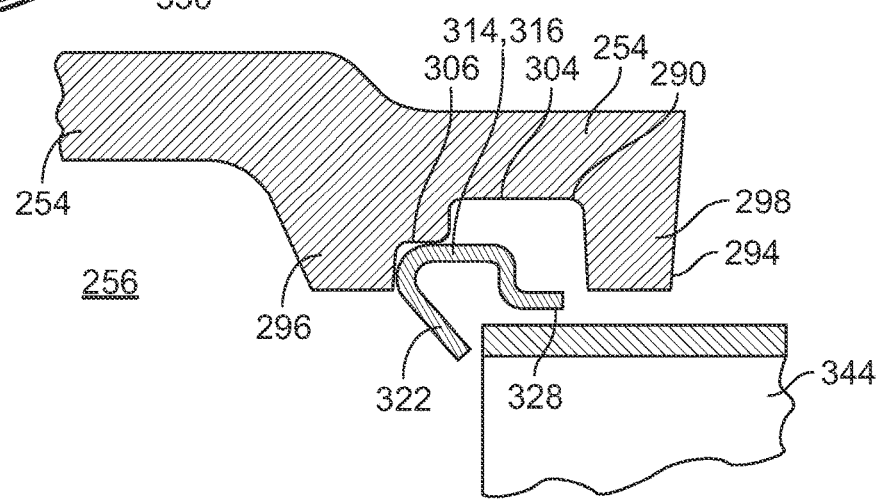
FIG. 18 is a partial cross sectional view of a portion of the example coupling shown in FIG. 13.

As shown in FIG. 17, a plurality of tabs 328 are positioned along an edge 330 oppositely disposed from edge 324. As shown in FIG. 16, tabs 328 are oriented substantially perpendicular to the radius 326 and are offset from the band 316 in the direction which teeth 322 project. This offset of tabs 328 permits the tabs to overlie the second floor 306, and the band 316 to overlie the first floor 304, when retainers 314 are properly received within respective channels 288 and 290 as shown in FIGS. 15 and 16. Proper assembly of the retainers 314 within the channels 288 and 290 permits pipe elements to be inserted into a pre-assembled coupling 250 as described below. However, as shown in FIG. 18, the channels 288 and 290 (only 290 shown) and the retainers 314 are sized such that if the coupling 250 is improperly assembled with the band 316 overlying the second floor 306 and the tabs 328 overlying the first floor 304 it is not possible to insert a pipe element into the coupling, also described below.

As shown in FIG. 15, segments 252 and 254 further comprise a third channel 332. Channel 332 is positioned between the first and second channels 288 and 290 and faces the central space 256. Channel 332 receives a ring seal 334 which ensures a fluid tight joint. Ring seal 334 is formed of a flexible, resilient material such as EPDM or other rubber compounds and has inner surfaces 336 sized to receive pipe elements when they are inserted into the central space 256 as described below. A pipe stop 338 is positioned between inner surfaces 336. The pipe stop projects into the central space 256 and promotes insertion of pipe elements by engaging the pipe elements when they are inserted into coupling 250 to the desired depth. In some embodiments, ring seal 334 also has an outer surface 340 that is sized such that it may cooperate with each band 316 to engage and support the segments 252 and 254 in spaced apart relation as shown in FIG. 13. The separation of the segments when supported by each band 316 and ring seal 334 is sufficient to permit pipe elements to be inserted into the coupling when it is in its pre-assembled state (FIG. 13). FIG. 15 shows an example channel configuration wherein the second floors 306 are positioned between the first floors 304 and the third channel 332. In this example the tabs 328 project toward the third channel when the retainers 314 are properly installed within the coupling 250.

As shown in FIGS. 13 and 15, each segment 252 and 254 also comprises first and second arcuate surfaces 300 and 302 respectively positioned on sidewalls 296 and 298. Arcuate surfaces 300 and 302 face the central space 256 and a plurality of projections 305 may be positioned on each arcuate surface 300, 302. Projections 305 are arranged in spaced relation to one another along the arcuate surfaces 300 and 302 and project toward the central space 256. Projections 305 increase joint stiffness and allow a wider tolerance range on the pipe outer diameter as described below.

Figure 19:
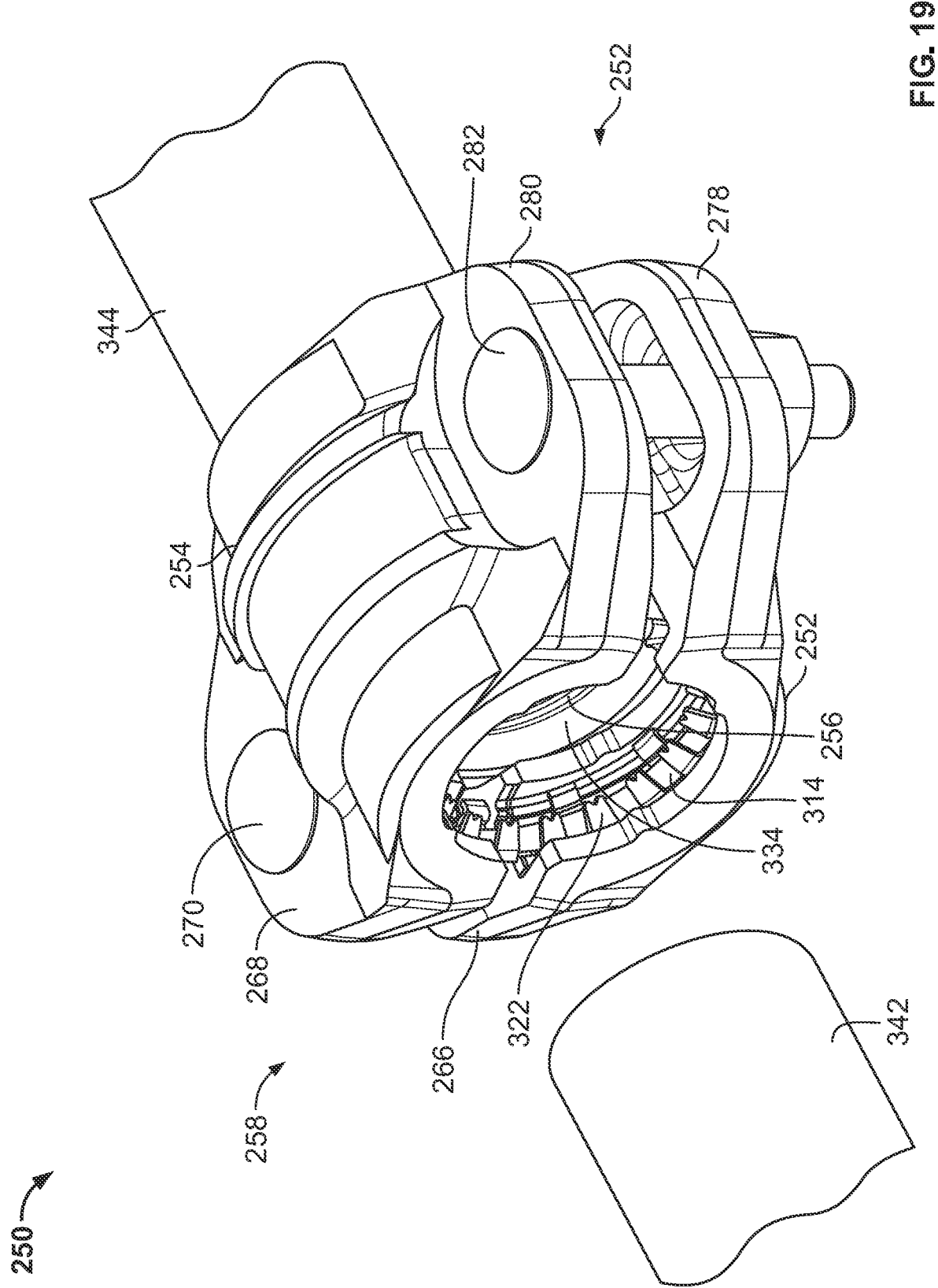
FIG. 19 is an isometric view illustrating assembly of a pipe joint using a coupling as shown in FIG. 13.
Figure 20:
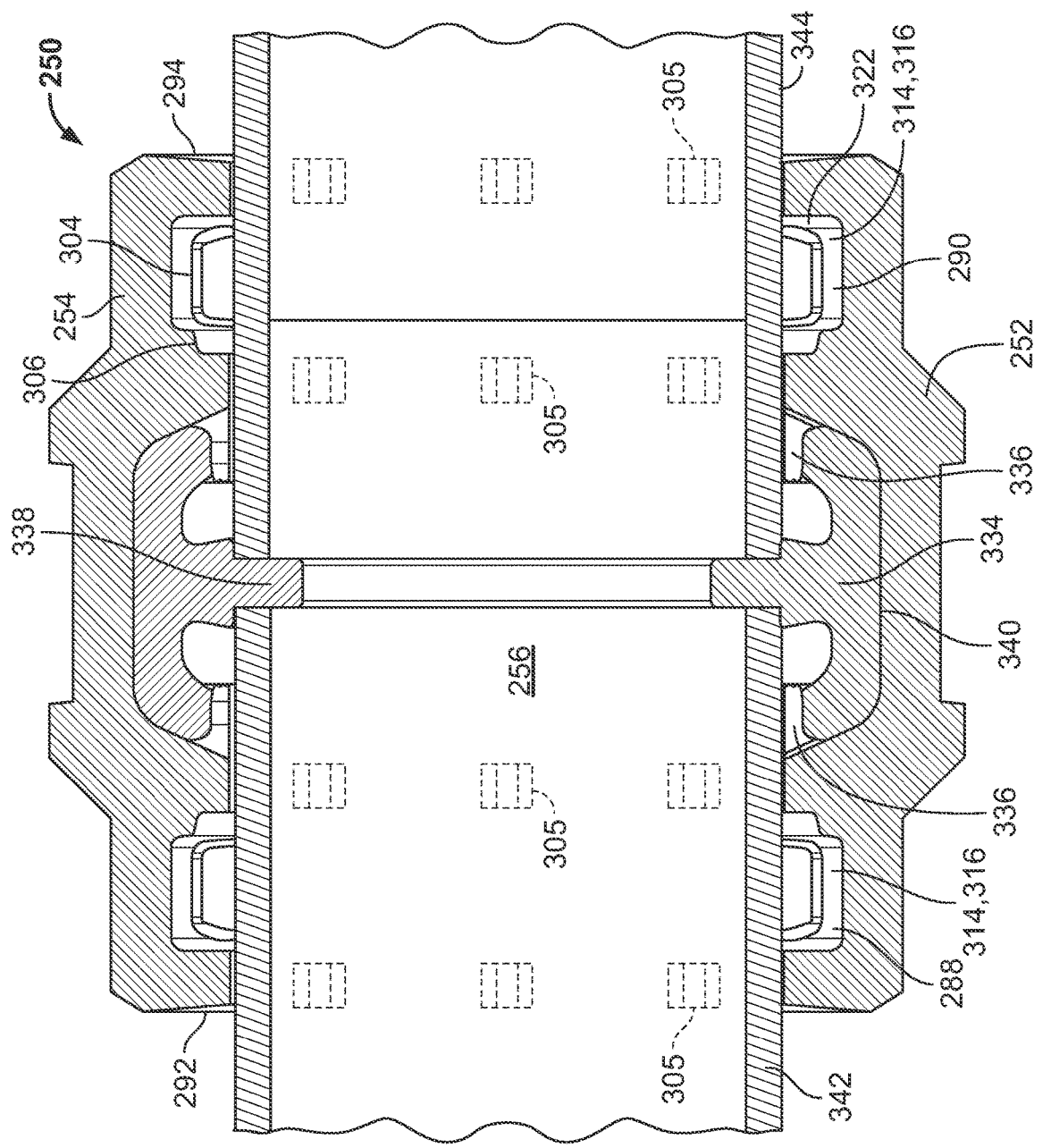
FIG. 20 is a sectional view illustrating assembly of a pipe joint using a coupling as shown in FIG. 13.

Operation of the example coupling 250 is illustrated in FIGS. 19 and 20. As shown in FIG. 19, coupling 250 is provided in the pre-assembled state, with the segments 252 and 254 attached to one another end to end using the attachment member 258 (comprising lugs 266 and 268 and fastener 270) and the attachment member 260 (comprising lugs 278, 280 and fastener 282). The segments 252 and 254 are held apart in spaced relation sufficient to permit insertion of pipe elements 342 and 344 into the central space 256 by the retainers 314, or, in another embodiment, by a combination of the retainers 314 and the undeformed ring seal 334. Whether the retainers 314 alone, or the retainers 314 in combination with the undeformed ring seal 334 hold the segments in spaced relation is dependent on the choice of material and geometry of retainers 314 and ring seal 334. With reference to FIG. 16, as pipe element 344 is inserted into central space 256, the retainer 314, being properly installed with band 316 overlying the first floor 304 and the tabs 328 overlying second floor 306, has a radius of curvature which allows the pipe element to clear teeth 322 which project into the central space 256 when the coupling 250 is in the preassembled state. However, if, as shown in FIG. 18, the retainer 314 is installed improperly, with the band 316 overlying the second floor 306, the retainer's radius of curvature is smaller and teeth 322 effectively prevent insertion of the pipe element 344 into the central space 256 with the segments 252 and 254 in spaced apart relation in the pre-assembled state. This cooperation between the retainer 314, its tabs 328, teeth 322, and the first and second floors 304 and 306 of channels 288 and 290 prevent improper assembly of a pipe joint using coupling 250. If the pipe elements 342 and 344 could be inserted with the retainer teeth 322 facing in the wrong direction (FIG. 18) then the teeth will not be self-actuating against forces which would draw or push the pipe element out of the coupling. Thus the retainer would not provide sufficient mechanical engagement preventing pipe element blowout when the joint is pressurized.

Once both pipe elements 342 and 344 are inserted into the central space engaging the pipe stop 338 and respective inner surfaces 336 of ring seal 334 (FIG. 20) the fasteners 270 and 282 are tightened. Tightening the fasteners 270 and 282 draws the segments 252 and 254 toward one another, and, as shown in FIG. 20, the segments compress the ring seal 334 and the retainers 314 against the pipe elements. Compression of ring seal 334 forms a fluid tight seal and compression of retainer 314 forces teeth 322 into mechanical engagement with the outer surfaces of pipe elements 342 and 344 to form a secure joint. The advantage of the angular orientation of teeth 322 is readily apparent, as it causes the teeth to be self-actuating and resist axial forces which would draw or push the pipe elements out of engagement with the coupling 250.

Projections 305 are also forced into engagement with the pipe elements 342 and 344 as the segments 252 and 254 are drawn toward one another. The projections 305 add stiffness to the joint between the coupling 250 and the pipe elements 342 and 344 upon their engagement with the outer surfaces of the pipe elements. Additionally, the projections 305 accommodate a larger pipe outer diameter tolerance. When the outer diameter of pipe elements 342 and 344 is near the small end of the tolerance range the presence of the projections 305 ensures mechanical engagement between the coupling 250 and the pipe elements 342 and 344. However, when the pipe diameter is at the large end of the tolerance range the projections will tend to deform the outer surface of the pipe elements locally. For couplings 250 used with plain end pipe elements this is particularly advantageous as plain end couplings are typically designed so that the arcuate surfaces 300, 302 (see FIG. 15) do not engage the outer surfaces of the pipe elements. This arrangement ensures that the clamping force provided by the fasteners 270 and 282 (see FIG. 14) is fully applied to the retainers 314. Were the arcuate surfaces 300, 302 of the coupling 250 to engage the pipe outer surface directly, the clamping force would be divided between contact of the arcuate surfaces with the pipe and contact between the retainers 314 and the pipe elements. Because the surface areas of projections 305 are small relative to the arcuate surfaces 300, 302, and contact the pipe element outer surface only at discrete points, only minimal clamping force from the fasteners 270 and 282 need to be diverted into contact between the projections 305 and the pipe elements 342 and 344 to provide enhanced stiffness without compromising the axial retention provided by the retainers 314.

Figure 21:
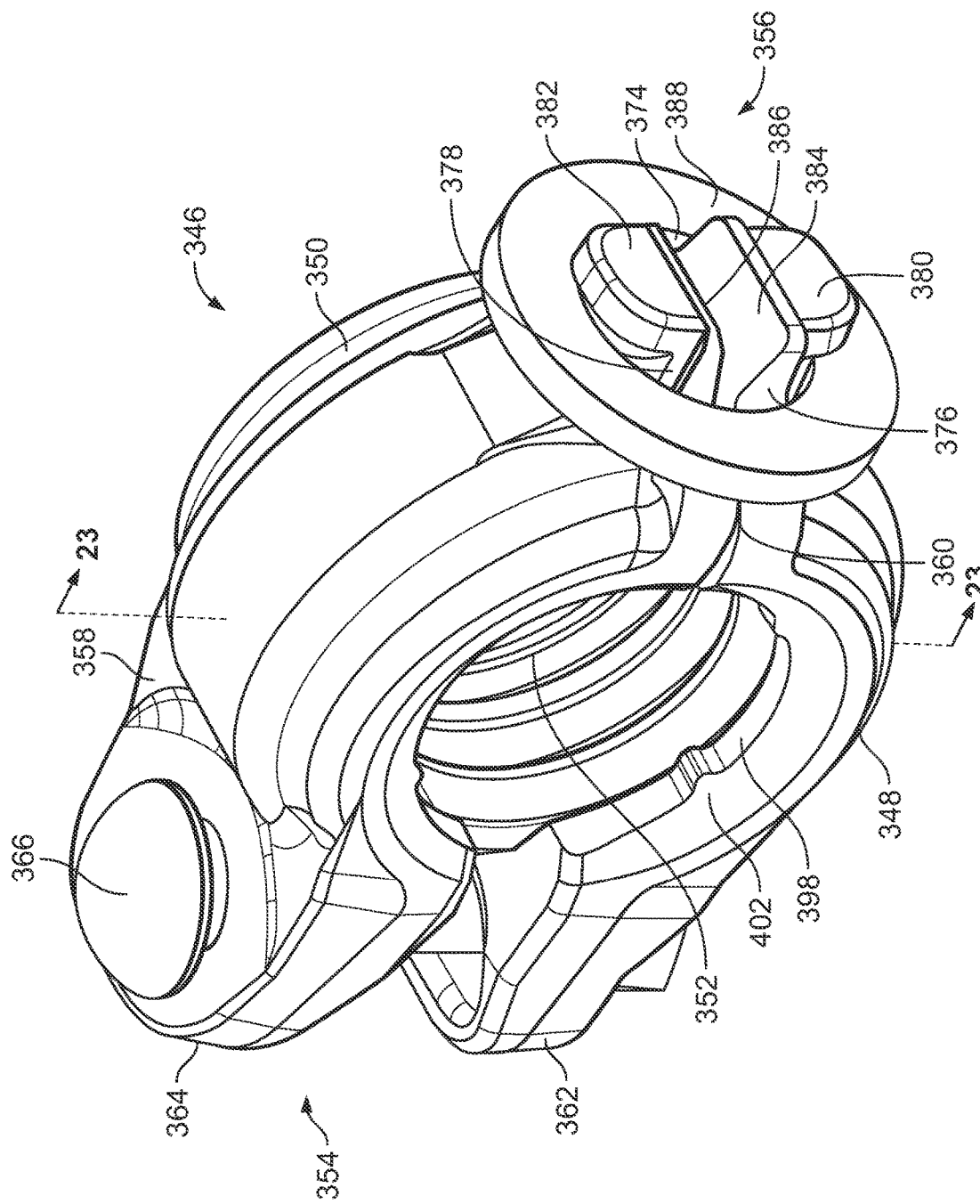
FIG. 21 is an isometric view of an example embodiment of a coupling according to the invention.
Figure 22:
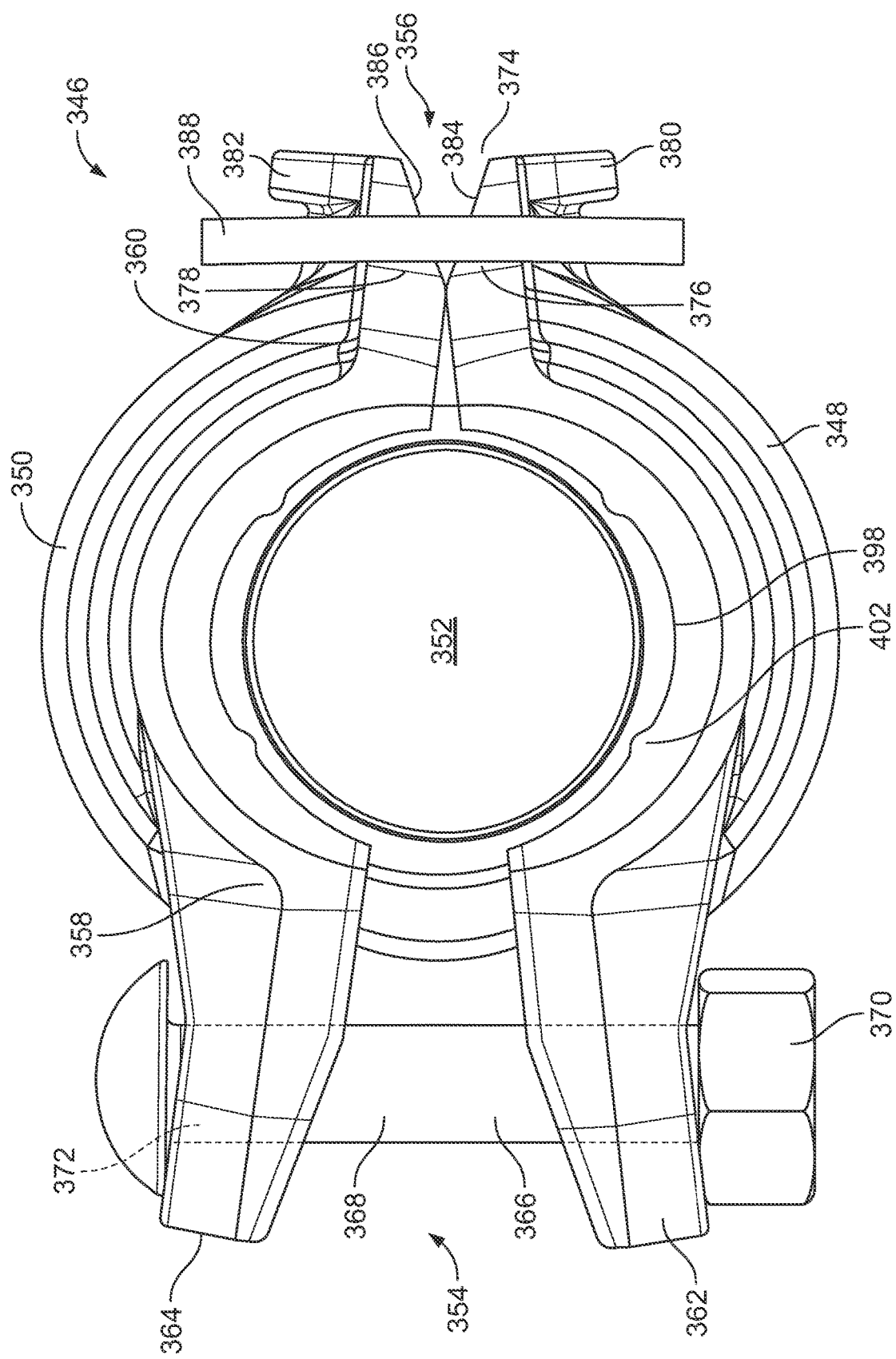
FIG. 22 is an axial view of the example coupling shown in FIG. 21.

FIGS. 21 and 22 show an example coupling 346 according to the invention. Coupling 346 comprises first and second segments 348 and 350 attached to one another surrounding a central space 352. Attachment of segments 348 and 350 is effected by first and second attachment members 354 and 356 positioned at respective opposite ends 358 and 360 of segments 348 and 350. In this example embodiment the first attachment member 354 comprises first and second lugs 362 and 364, and a fastener 366 comprising a bolt 368 and a nut 370. Lugs 362 and 364 are in facing relation to one another and extend from ends 358 of respective segments 348 and 350. The lugs have holes 372 which receive fastener 366, the fastener extending between the first and second lugs. Comprised of lugs 362, 364 and fastener 366, the first attachment member is adjustably tightenable for drawing the segments 348 and 350 toward one another to join pipe elements as described below.

As further shown in FIGS. 21 and 22, the second attachment member 356 comprises a hinge 374. In this example embodiment hinge 374 comprises first and second bosses 376 and 378 which project respectively from ends 360 of the segments 348 and 350. As shown in FIGS. 21 and 22, each boss 376 and 378 has a respective enlarged head 380 and 382, as well as respective first and second lands 384 and 386. Lands 384 and 386 are in facing relation with one another and are angularly oriented with respect to one another to permit pivoting action of the segments about the hinge 374. Hinge 374 further comprises a ring 388 which surrounds the bosses 376 and 378. Ring 388 is retained to the bosses by the heads 380 and 382 and the inner circumference of the ring provides the reaction surface against which the bosses 376 and 378 react when fastener 366 is tightened to draw the segments 348 and 350 toward one another. The angular orientation of the lands 384 and 386 provide clearance enabling the heads 380 and 382 to be positioned within the ring 388 when the lands are in face to face contact during assembly of the coupling 346.

Figure 23:
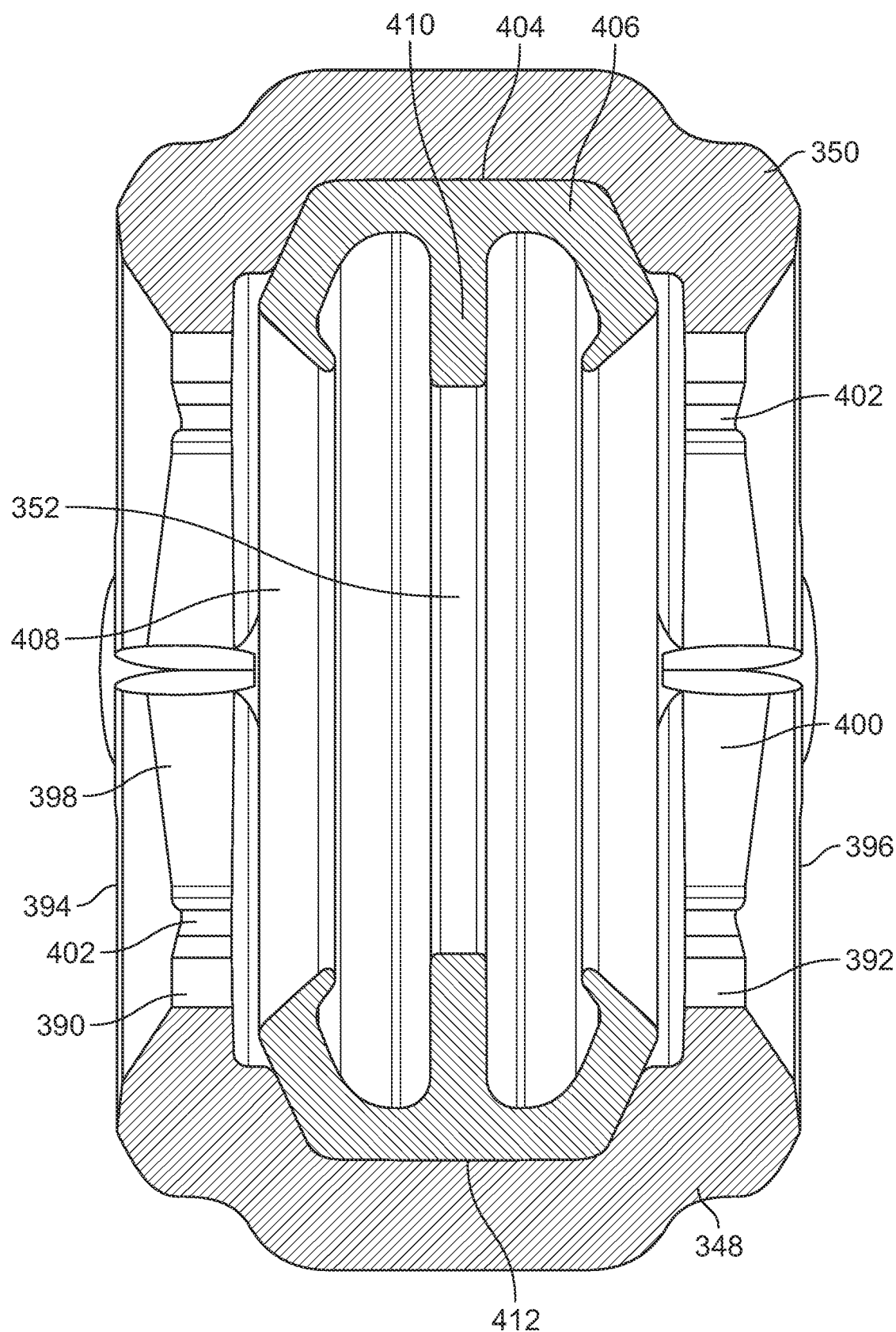
FIG. 23 is a sectional view taken at line 23-23 of FIG. 21.

As shown in cross section in FIG. 23 each segment 348 and 350 comprises first and second sidewalls 390 and 392 respectively positioned on opposite sides 394 and 396 of each segment. The first and second sidewalls 390 and 392 extend between the ends 358 and 360 of segments 348 and 350 (see FIG. 21). As shown in detail in FIG. 23, each sidewall 390, 392 comprises a respective arcuate surface 398 and 400 facing the central space 352. Each sidewall 390, 392 furthermore has a plurality of projections 402 positioned on each arcuate surface 398, 400. Projections 402 are arranged in spaced relation to one another along the arcuate surfaces and project toward the central space 352.

As shown in FIG. 23, segments 348 and 350 further comprise a channel 404. Channel 404 is positioned between the first and second sidewalls 390 and 392 and faces the central space 352. Channel 404 receives a ring seal 406 which ensures a fluid tight joint. Ring seal 406 is formed of a flexible, resilient material such as EPDM or other rubber compounds and has inner surfaces 408 sized to receive pipe elements when they are inserted into the central space 352 as described below. A pipe stop 410 is positioned between inner surfaces 408. The pipe stop projects into the central space 352 and promotes insertion of pipe elements by engaging the pipe elements when they are inserted into coupling 346 to the desired depth. Ring seal 406 also has an outer surface 412 that is sized to engage and support the segments 348 and 350 in spaced apart relation as shown in FIG. 21. The separation of the segments when supported by ring seal 406 is sufficient to permit pipe elements to be inserted into the coupling, clearing the projections 402 when the coupling 346 is in its pre-assembled state (FIG. 21).

Figure 24:
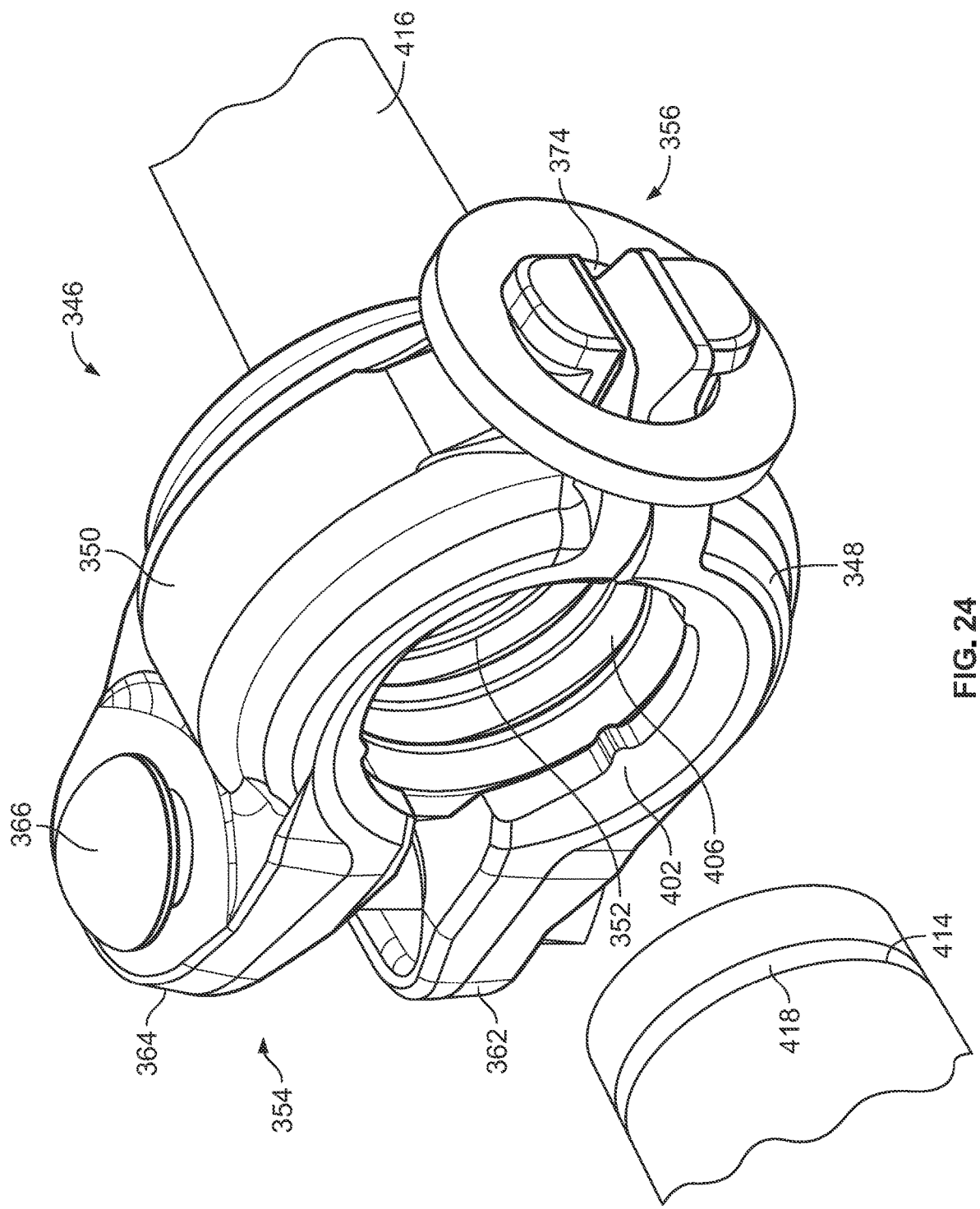
FIG. 24 is an isometric view illustrating assembly of a pipe joint using a coupling as shown in FIG. 21.
Figure 25:
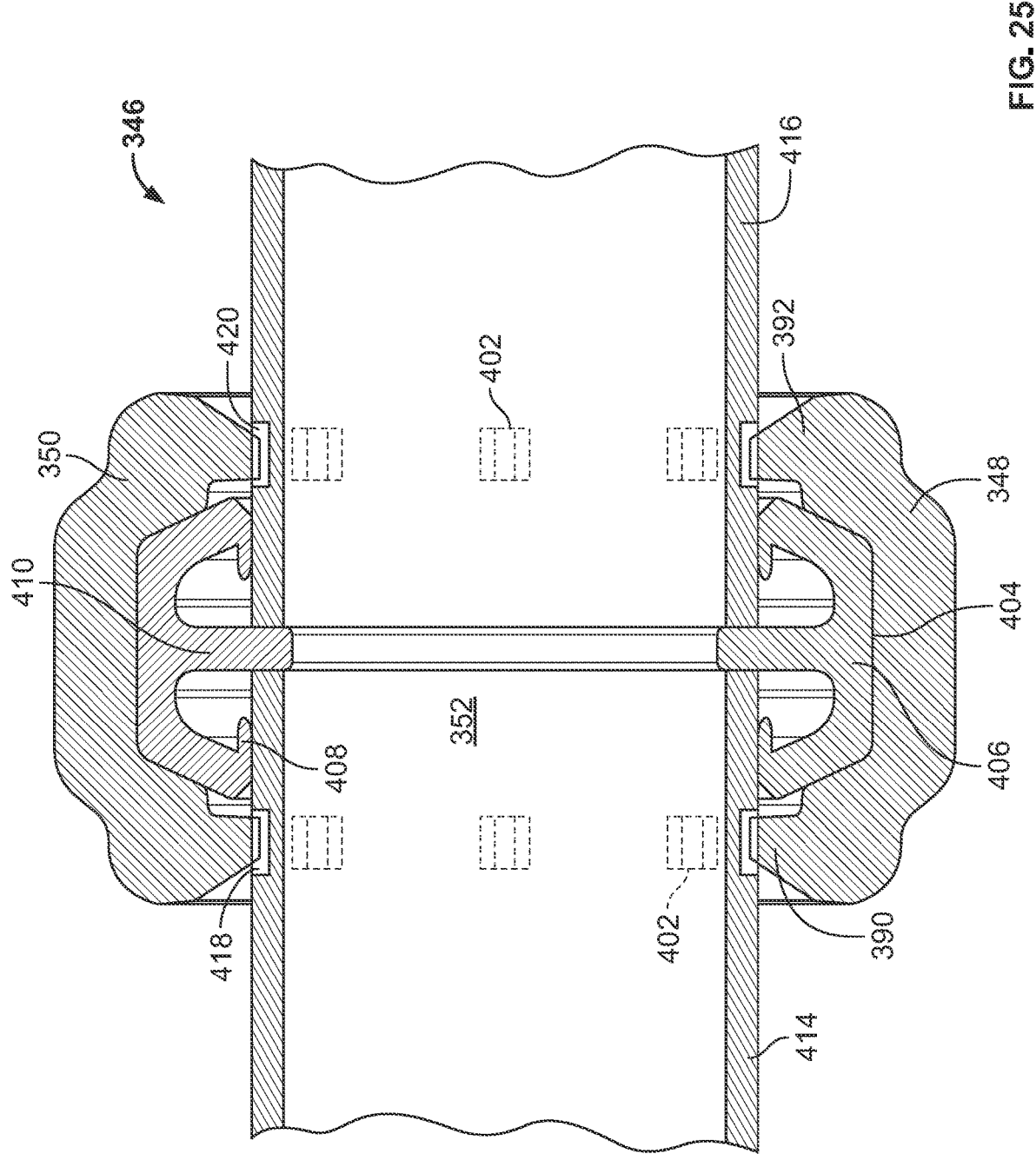
FIG. 25 is a sectional view illustrating assembly of a pipe joint using a coupling as shown in FIG. 21.

Operation of the example coupling 346 is illustrated in FIGS. 24 and 25. As shown in FIG. 24, coupling 346 is provided in the pre-assembled state, with the segments 348 and 350 attached to one another end to end using the attachment members 354 and 356, in this example fastener 366, lugs 362 and 364 and hinge 374. When undeformed, ring seal 406 holds the segments 348 and 350 in spaced apart relation sufficient to permit insertion of pipe elements 414 and 416 into the central space 352 as illustrated in FIG. 24. It is advantageous that ring seal 406 has sufficient stiffness to support the segments 348 and 350 in spaced relation during shipping and handling and during installation. With reference to FIG. 25, as pipe elements 414 and 416 are inserted into central space 352, their outer surfaces engage the inner surfaces 408 of the ring seal 406. The ends of the pipe elements engage the pipe stop 410, and this engagement aligns the sidewalls 390 and 392 with respective circumferential grooves 418 and 420 in the pipe elements 414 and 416. Once both pipe elements 414 and 416 are inserted into the central space engaging the pipe stop 410 and respective inner surfaces 408, the fastener 366 is tightened, causing the segments 348 and 350 to pivot about hinge 374 (see FIG. 22). Tightening the fastener 366 draws the segments 348 and 350 toward one another, and, as shown in FIG. 25, the segments compress the ring seal 406 and cause the projections 402 to engage the pipe elements 414, 416 within their respective grooves 418 and 420.

Projections 402 provide additional stiffness in bending, rotation and axially to the coupling 346 over designs without the projections. The projections also accommodate a wider tolerance range on pipe diameter, which is advantageous for small diameter pipe elements (3 inches or less). For example, when the diameter of grooves 418 and 420 is near the small end of the tolerance range the presence of the projections 402 ensures mechanical engagement between the coupling 346 and the pipe elements 414 and 416. However, when the pipe diameter is at the large end of the tolerance range the projections will tend to deform the pipe elements locally within the grooves 418 and 420.

Figure 26:
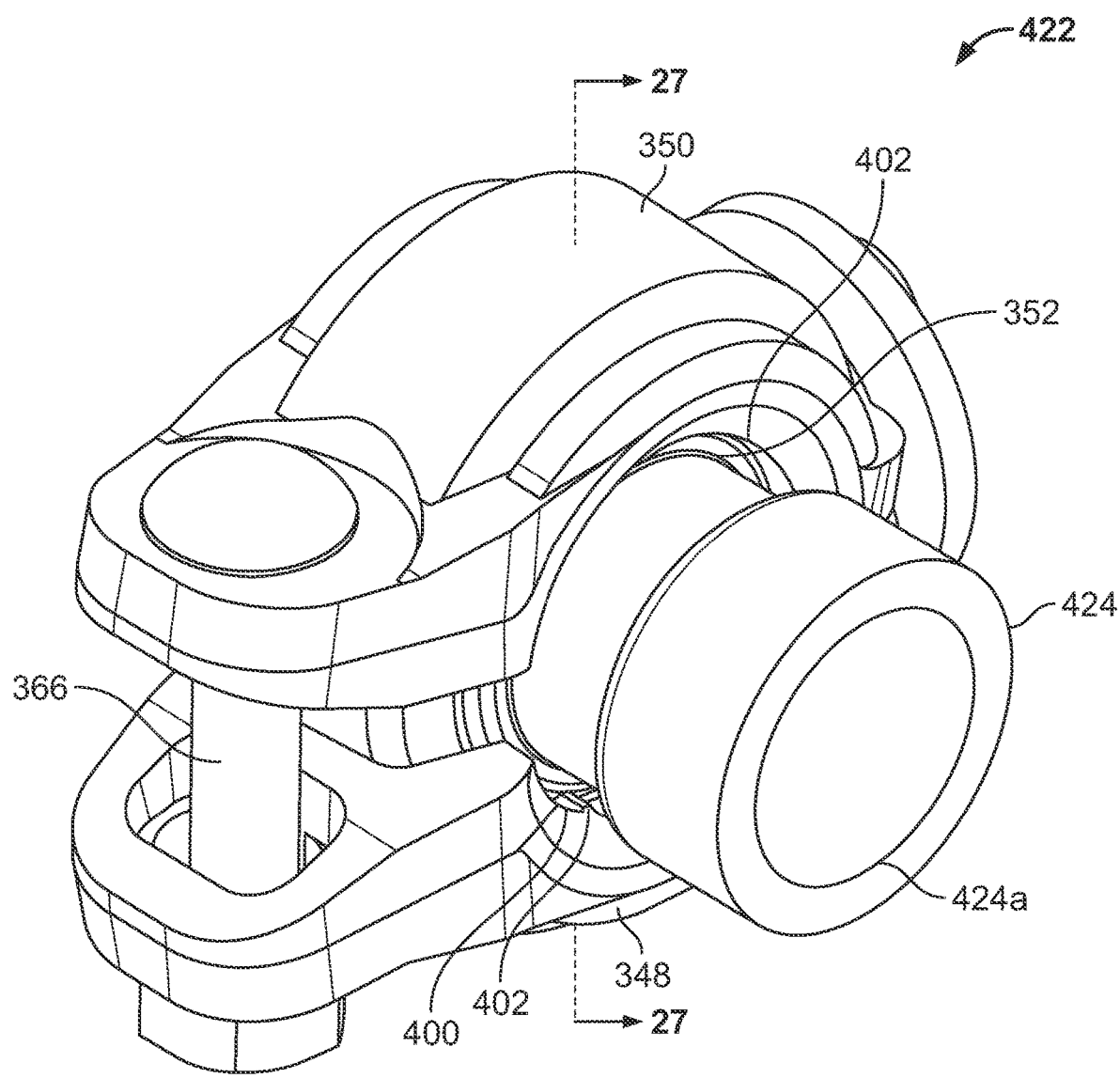
FIG. 26 is an isometric view of an example embodiment of a coupling according to the invention.
Figure 27:
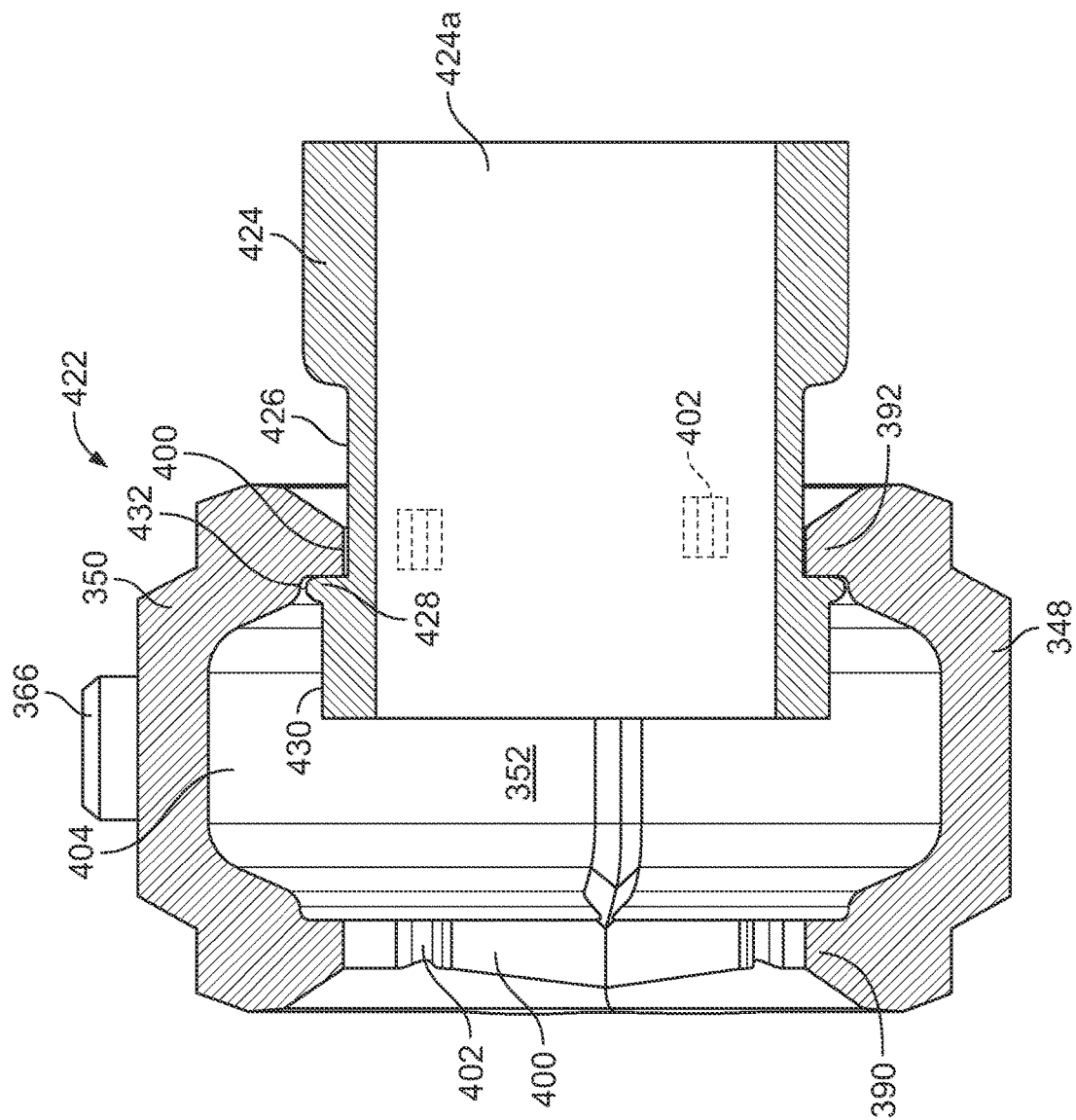
FIG. 27 is a sectional view taken at line 27-27 of FIG. 26.
Figure 28:
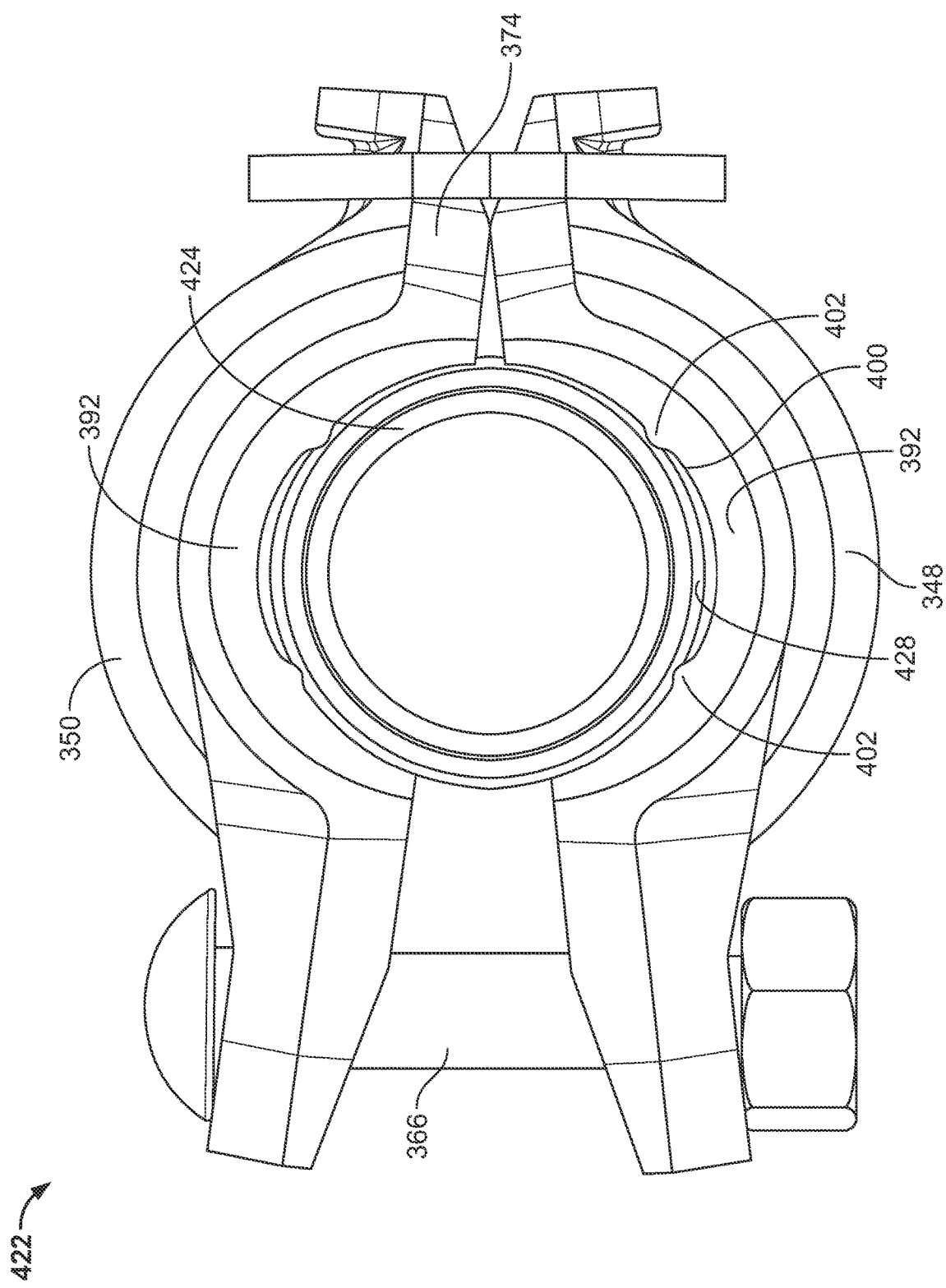
FIG. 28 is an axial view of the fitting shown in FIG. 26.

FIGS. 26-28 show another coupling embodiment 422 in the preassembled state having a captured pipe element 424. Coupling 422, shown in FIG. 26, is similar in structure to coupling 346 (described above) and useful for items such as valves wherein the pipe element 424 comprises an integral part of the valve, for example an inlet and/or an outlet conduit of the valve. Such a valve would be provided with the coupling or couplings 422 attached at either or both ends and with the coupling in its preassembled state, allowing the valve to be rapidly integrated into a piping network by inserting the free ends of pipe elements of the network into the central space 352 of each coupling 422 opposite to the captured pipe element 424 and then tightening the fasteners 366. The captured pipe element coupling 422 obviates the need to disassemble and reassemble the couplings and the valve. The valve or other component which uses the captured pipe element coupling 422 is not shown for clarity, but would be located at the free end 424a of the pipe element 424.

FIG. 27 shows the captured pipe element 424 and coupling 422 in detail. Pipe element 424 is received within the central space 352 and has a groove 426 that receives sidewalls 392 on segments 348 and 350, the other side of the coupling comprising sidewalls 390 being open for receiving a pipe element to which the valve or other item of which pipe element 424 is a component. A circumferential bead 428 is positioned contiguous with the groove 426 and has a larger diameter than the sealing surface 430 of the pipe element 424. Sealing surface 430 engages a ring seal (not shown) positioned within the channel 404 and provides a fluid tight seal between the coupling and the pipe element. Bead 428 is received within a circumferential recess 432 in the sidewall 392. The bead 428, groove 426 and sidewall 392 are sized such that the bead and sidewall overlap when the segments 348 and 350 of coupling 422 are supported in spaced relation (for example by a ring seal in channel 404, not shown) sufficient to permit a pipe element (without a bead) to be inserted into central space 352 from the side opposite to the captured pipe element 424. Mechanical engagement between the bead 428 and the sidewall 392 thus capture the pipe element 424 when the coupling 422 is in the pre-assembled state shown in FIG. 26.

FIG. 28 shows another advantage of projections 402 on the arcuate surfaces 400 of sidewall 392. Due to the angular separation of the segments 348 and 350 the degree of overlap between the sidewalls 392 and the bead 428 decreases with distance from the hinge 374. Projections 402 extend toward the central space 352 and provide additional overlap with bead 428 and hence mechanical engagement at points farther from the hinge 374, thereby ensuring that pipe element 424 remains captured by the segments 348 and 350.

What is claimed is:

1. In combination, a preassembled coupling and a captured pipe element for connecting a second pipe element to said captured pipe element, said combination comprising:
    a coupling assembly comprising:
        a first segment having first and second ends oppositely disposed from one another;
        a second segment having first and second ends oppositely disposed from one another, said first ends of said first and second segment defining a first end of said coupling assembly, said second ends of said first and second segments defining a second end of said coupling assembly;
        a first attachment member positioned at said first end of said coupling assembly;
        a second attachment member positioned at said second end of said coupling assembly;
        a first arcuate projection extending along a first side of said first segment and projecting toward a central space surrounded by said first and second segments, and a second arcuate projection extending along a second side of said first segment and projecting toward said central space, a first channel being defined between said first and second arcuate projections of said first segment;
        a first arcuate projection extending along a first side of said second segment and projecting toward said central space, and a second arcuate projection extending along a second side of said second segment and projecting toward said central space, a second channel being defined between said first and second arcuate projections of said second segment;
        a ring seal positioned within said first and second channels, and,
    wherein said captured pipe element comprises:
        an annular body having an end face positioned within said central space;
        a circumferential groove in said annular body positioned in spaced relation to said end face, said first arcuate projections of said first and second segments being engageable with said circumferential groove;
        a bead extending circumferentially around said annular body and projecting outwardly therefrom, said bead being positioned between said end face and said groove; wherein
        said first and second segments are supported in spaced apart relation sufficient to permit insertion of said second pipe element into said central space while capturing said captured pipe element, said end face of said captured pipe element being retained within said central space by engagement between said bead and said coupling assembly.

2. The combination according to claim 1, wherein said bead is positioned in spaced relation away from said end face.

3. The combination according to claim 1, wherein said first and said second attachment members are adjustably tightenable.

4. The combination according to claim 3, wherein said first attachment member comprises:
    a first lug extending from said first end of said first segment;
    a first lug extending from said first end of said second segment;
    a first bolt extending between said first lugs; and
    a first nut engaged with said first bolt, said first nut and said first bolt cooperating with said first lugs on said first and second segments to attach said first and second segments to one another.

5. The combination according to claim 4, wherein said second attachment member comprises:
    a second lug extending from said second end of said first segment;
    a second lug extending from said second end of said second segment;
    a second bolt extending between said second lugs; and
    a second nut engaged with said second bolt, said second nut and said second bolt cooperating with said second lugs on said first and second segments to attach said first and second segments to one another.

6. The combination according to claim 1, wherein said first attachment member comprises:
    a first lug extending from said first end of said first segment;
    a first lug extending from said first end of said second segment;
    a first bolt extending between said first lugs;
    a first nut engaged with said first bolt, said first nut and said first bolt cooperating with said first lugs on said first and second segments to attach said first and second segments to one another; and, wherein said second attachment member comprises a hinge pivotably attaching said second ends of said first and second segments to one another.

7. The combination according to claim 6, wherein said hinge comprises a spring assembly joining said second end of said first segment to said second end of said second segment, said spring assembly biasing said segments away from one another.

8. The combination according to claim 7, wherein said spring assembly comprises:
a first boss projecting from said second end of said first segment;
a second boss projecting from said second end of said second segment and positioned adjacent to said first boss;
a fulcrum positioned on said first boss and contacting said second boss, said first and second segments pivoting about said fulcrum;
a link extending between and capturing said first and second bosses.

9. The combination according to claim 1, wherein said ring seal supports said segments in spaced relation sufficient to permit insertion of said second pipe element into said central space while said first and second segments are attached to one another.

10. The combination according to claim 9, wherein said ring seal has inner surfaces sized to receive said captured pipe element and said second pipe element.

11. The combination according to claim 5, wherein said ring seal has inner surfaces sized to receive said captured pipe element and said second pipe element;
said inner surfaces of said ring seal, when undeformed, have an innermost extent located at a first radial distance from an axis arranged coaxially with said captured pipe element;
said segments are supported such that midpoints of said first arcuate projections are supported at a second radial distance from said axis;
an outermost portion of said bead is located a third radial distance from said axis; and
said third radial distance is greater than said first radial distance.

12. The combination according to claim 10, wherein:
said inner surfaces of said ring seal, when undeformed, have an innermost extent located at a first radial distance from an axis arranged coaxially with said captured pipe element;
said segments are supported such that midpoints of said first arcuate projections are supported at a second radial distance from said axis; and
said third radial distance of said bead is greater than said second radial distance of said midpoint of said first arcuate projections.

13. The combination according to claim 9, where said bead is engaged with said ring seal.

14. The combination according to claim 13, where engagement between said bead and said ring seal creates interference that impedes movement of said captured pipe element in a first direction along an axis arranged coaxially with said captured pipe element.

15. The combination according to claim 1, wherein:
said first arcuate projection extending along said first side of said first segment comprises a first shoulder extending along said first segment and projecting toward said central space, and, a first arcuate surface positioned on and extending along said first shoulder;
said second arcuate projection extending along said second side of said first segment comprises a second shoulder extending along said first segment and projecting toward said central space, said first and second shoulders facing one another, and, a second arcuate surface positioned on and extending along said second shoulder;
said first arcuate projection extending along said first side of said second segment comprises a third shoulder extending along said second segment and projecting toward said central space, and, a third arcuate surface positioned on and extending along said third shoulder;
said second arcuate projection extending along said second side of said second segment comprises a fourth shoulder extending along said second segment and projecting toward said central space, said third and fourth shoulders facing one another, and, a fourth arcuate surface positioned on and extending along said fourth shoulder.

16. The combination according to claim 15, where said captured pipe element further comprises a pipe shoulder positioned distal to said end face and adjacent to said groove.

17. The combination according to claim 16, where interference between said pipe shoulder and said coupling assembly acts to limit movement of said captured pipe element along an axis arranged coaxially with said captured pipe element.

18. The combination according to claim 17, where said captured pipe element is retained within said central space such that said first shoulder of said coupling assembly is located axially between said pipe shoulder and said bead.

19. The combination according to claim 18, where said captured pipe element further comprises a sealing surface extending around said annular body and axially positioned between said end face and said groove.

20. The combination according to claim 19, where said sealing surface is axially positioned between said end face and said bead.

21. The combination according to claim 19, where said sealing surface is disposed at a first diameter, and where said pipe shoulder is disposed at a second diameter greater than said first diameter.

* * * * *